(12) United States Patent
Qin et al.

(10) Patent No.: US 12,543,384 B2
(45) Date of Patent: Feb. 3, 2026

(54) MANUFACTURING METHOD FOR OPTICAL DEVICE, AND OPTICAL DEVICE

(71) Applicant: BEIJING SEETRUM TECHNOLOGY CO., LTD., Beijing (CN)

(72) Inventors: Qiujun Qin, Beijing (CN); Yu Wang, Beijing (CN); Zhilei Huang, Beijing (CN)

(73) Assignee: BEIJING SEETRUM TECHNOLOGY CO., LTD., Beijing (CN)

( * ) Notice: Subject to any disclaimer, the term of this patent is extended or adjusted under 35 U.S.C. 154(b) by 372 days.

(21) Appl. No.: 18/275,268

(22) PCT Filed: Jan. 27, 2022

(86) PCT No.: PCT/CN2022/074238
§ 371 (c)(1),
(2) Date: Aug. 1, 2023

(87) PCT Pub. No.: WO2022/161427
PCT Pub. Date: Aug. 4, 2022

(65) Prior Publication Data
US 2024/0153985 A1    May 9, 2024

(30) Foreign Application Priority Data

Feb. 1, 2021 (CN) .......................... 202110135606.6
Feb. 1, 2021 (CN) .......................... 202110136746.5
(Continued)

(51) Int. Cl.
*H10F 39/00* (2025.01)
*H10F 39/10* (2025.01)

(52) U.S. Cl.
CPC ......... *H10F 39/011* (2025.01); *H10F 39/107* (2025.01)

(58) Field of Classification Search
CPC .... H10F 39/011; H10F 39/107; H10F 39/016; H10F 39/026; H10F 39/028; H10F 39/024; H01L 21/30; G02B 6/13
See application file for complete search history.

(56) References Cited

U.S. PATENT DOCUMENTS 9,935,248 B2    4/2018  Kong
11,011,503 B2 *  5/2021  Wang ...................... H01L 24/95
(Continued)

FOREIGN PATENT DOCUMENTS

CN    101132047    2/2008
CN    101297228    10/2008
(Continued)

OTHER PUBLICATIONS

English language translation of International Search Report issued Mar. 10, 2022 in corresponding International (PCT) Patent Application No. PCT/CN2022/074238.
(Continued)

*Primary Examiner* — David Vu
(74) *Attorney, Agent, or Firm* — Wenderoth, Lind & Ponack, L.L.P.

(57) ABSTRACT

Disclosed are a manufacturing method for an optical device, and the optical device. The manufacturing method includes: providing a transferring member and an optical device to be transferred, wherein the transferring member includes a target transferring layer having a regular crystal orientation structure; forming a light-transmissive dielectric layer on a surface of the optical device to be transferred; coupling the transferring member to the optical device to be transferred in such a way of bonding the target transferring layer of the
(Continued)

transferring member to the light-transmissive dielectric layer of the optical device to be transferred; and retaining at least part of the target transferring layer of the transferring member to form the optical device. Therefore, the surface of the optical device manufactured in the foregoing specific manufacturing method can form an optical layer structure having the regular crystal orientation structure.

20 Claims, 19 Drawing Sheets

(30) Foreign Application Priority Data

Feb. 1, 2021 (CN) .......................... 202110136772.8
Jul. 19, 2021 (CN) .......................... 202110815321.7

(56) References Cited

U.S. PATENT DOCUMENTS

| | | |
|---|---|---|
| 2002/0017652 A1 | 2/2002 | Illek et al. |
| 2005/0208694 A1 | 9/2005 | Yue |
| 2007/0097485 A1 | 5/2007 | Yang et al. |
| 2014/0042445 A1 | 2/2014 | Kao et al. |

FOREIGN PATENT DOCUMENTS

| | | |
|---|---|---|
| CN | 102033332 | 4/2011 |
| CN | 103579264 | 2/2014 |
| CN | 104335088 | 2/2015 |
| CN | 106935489 | 7/2017 |
| CN | 107170766 | 9/2017 |
| CN | 111480236 | 7/2020 |
| CN | 112510059 | 3/2021 |
| EP | 1 811 561 | 7/2007 |
| EP | 2 648 025 | 10/2013 |
| KR | 10-2007-0077438 | 7/2007 |
| KR | 10-2017-0123151 | 11/2017 |
| WO | 2011/037686 | 3/2011 |
| WO | 2012/154589 | 11/2012 |
| WO | 2014/009029 | 1/2014 |
| WO | 2019/118846 | 6/2019 |

OTHER PUBLICATIONS

English language translation of Written Opinion issued Mar. 10, 2022 in corresponding International (PCT) Patent Application No. PCT/CN2022/074238.

* cited by examiner

MANUFACTURING METHOD FOR OPTICAL DEVICE, AND OPTICAL DEVICE

TECHNICAL FIELD

The application relates to the field of semiconductor optics, in particular to a manufacturing method for an optical device, and an optical device manufactured by the manufacturing method.

BACKGROUND ART

Silicon material is currently the most important semiconductor material. Monoatomic silicon is a relatively active non-metallic element, which can form silicide with 64 of the 96 stable elements. The main use of silicon depends on its semiconducting properties.

Crystalline silicon includes monocrystalline silicon and polycrystalline silicon. The mainstream manufacturing method for polycrystalline silicon is firstly reducing silicon dioxide with carbon to generate silicon, then purifying by hydrogen chloride reaction to obtain polycrystalline silicon with higher concentration; while the mainstream manufacturing method for monocrystalline silicon is firstly preparing polycrystalline silicon or amorphous silicon, then generating rod-shaped monocrystalline silicon from a melt by Czochralski method or floating zone melting method. Monocrystalline silicon is a crystal with a complete lattice structure, and the crystal orientation of silicon atoms inside it is regular.

In some existing optical devices, it is necessary to form a layer of silicon crystal or silicon compound on its surface; for example, in the structural configuration of a spectral chip, it is necessary to form a layer of silicon crystal on its surface and process the silicon crystal to obtain a light modulation layer, thereby modulating the light passing through the light modulation layer. However, in the preparation process, since the processes including Czochralski method or floating zone melting method which can form silicon crystals or silicide with regular crystal orientation are not suitable for forming silicon crystals or silicide on the surface of an optical device. Therefore, in actual industry, silicon crystals or silicide are usually formed on an optical device by vapor deposition. However, this manufacturing method has many disadvantages.

First of all, the internal atoms of silicon crystals or silicide obtained by vapor deposition are not regularly arranged. In other words, compared with silicon crystals and silicide formed by Czochralski method or floating zone melting method, the consistency and regularity of the crystal orientation of the internal atoms in the silicon crystals or silicide obtained by vapor deposition are poor.

Furthermore, for some optical devices with special requirements, incompletely regular silicon crystals or silicide will affect the performance of the optical device, i.e., it cannot be guaranteed that the performance of the manufactured optical device meets the preset requirements.

For example, in the existing manufacturing method for spectral chips, a layer of silicon crystal is deposited on the photosensitive chip by vapor deposition method, and the silicon crystal is processed to obtain a light modulation layer, thereby modulating the light transmitting through the modulation layer. For a spectral chip, it needs the refractive index of the modulation layer to be as high as possible, so the high transmittance can make the light loss small. However, the silicon crystal obtained by vapor deposition method has poor regularity of crystal orientation due to its atomic arrangement, so that the transmittance of the modulation layer is relatively low, and the overall modulation effect of the modulation layer is not desirable.

Therefore, there is a need for an optimized manufacturing method for optical devices.

SUMMARY OF THE INVENTION

An advantage of the present application is to provide a manufacturing method for an optical device and an optical device, wherein the manufacturing method migrates silicon crystals or silicide with a better crystal orientation arrangement to the surface of the optical device to be transferred in a way similar to physical transfer, so that the surface of the manufactured optical device has an optical layer structure with better crystal orientation arrangement.

Other advantages and features of the present application will become apparent through the following description, and can be realized by the means and combinations particularly pointed out in the appended claims.

In order to achieve at least one of the above advantages, the present application provides a manufacturing method for an optical device, including:
 providing a transferring member and an optical device to be transferred, wherein the transferring member includes a target transferring layer having a regular crystal orientation structure;
 forming a light-transmissive dielectric layer on the surface of the optical device to be transferred;
 coupling the transferring member to the optical device to be transferred in such a way that the target transferring layer of the transferring member is bonded to the light-transmissive dielectric layer of the optical device to be transferred; and
 retaining at least a part of the target transferring layer of the transferring member to form the optical device.

In the manufacturing method for the optical device according to the present application, the upper surface of the light-transmissive dielectric layer is a flat surface.

In the manufacturing method for the optical device according to the present application, forming the light-transmissive dielectric layer on the surface of the optical device to be transferred includes: depositing the light-transmissive dielectric layer on the surface of the optical device to be transferred by a vapor deposition process; and processing the upper surface of the light-transmissive dielectric layer so that the upper surface of the light-transmissive dielectric layer is a flat surface.

In the manufacturing method for the optical device according to the present application, before depositing the light-transmissive dielectric layer on the surface of the optical device to be transferred by the vapor deposition process, it further includes: pre-processing the surface of the optical device to be transferred, so that the part of the surface of the optical device to be transferred for depositing the light-transmissive dielectric layer is a flat surface.

In the manufacturing method for the optical device according to the present application, processing the upper surface of the light-transmissive dielectric layer so that the upper surface of the light-transmissive dielectric layer is a flat surface includes: polishing the upper surface of the light-transmissive dielectric layer by a chemical mechanical polishing process, so that the upper surface of the light-transmissive dielectric layer is a flat surface.

In the manufacturing method for the optical device according to the present application, the transferring member further includes a bonding layer formed on the surface of the target transferring layer, and the bonding layer is made of the same material as the light-transmissive dielectric layer; wherein coupling the transferring member to the optical device to be transferred in such a way that the target transferring layer of the transferring member is bonded to the light-transmissive dielectric layer of the optical device to be transferred includes: coupling the transferring member to the optical device to be transferred in such a way that the bonding layer formed on the surface of the target transferring layer is bonded to the light-transmissive dielectric layer of the optical device to be transferred.

In the manufacturing method for the optical device according to the present application, coupling the transferring member to the optical device to be transferred in such a way that the target transferring layer of the transferring member is bonded to the light-transmissive dielectric layer of the optical device to be transferred includes: forming a bonding layer on the surface of the target transferring layer of the transferring member, wherein the bonding layer is made of the same material as the light-transmissive dielectric layer; and coupling the transferring member to the optical device to be transferred in such a way that the bonding layer formed on the surface of the target transferring layer is bonded to the light-transmissive dielectric layer of the optical device to be transferred.

In the manufacturing method for the optical device according to the present application, forming a bonding layer on the surface of the target transferring layer of the transferring member includes: processing the surface of the target transferring layer to form the bonding layer on the surface of the target transferring layer of the transferring member, wherein the bonding layer is made of the same material as the light-transmissive dielectric layer.

In the manufacturing method for the optical device according to the present application, forming a bonding layer on the surface of the target transferring layer of the transferring member includes: stacking the bonding layer on the surface of the target transferring layer, wherein the bonding layer is made of the same material as the light-transmissive dielectric layer.

In the manufacturing method for the optical device according to the present application, retaining at least a part of the target transferring layer of the transferring member to form the optical device includes: removing other portions of the transferring member other than the target transferring layer to retain the target transferring layer of the transferring member to form the optical device.

In the manufacturing method for the optical device according to the present application, retaining at least a part of the target transferring layer of the transferring member to form the optical device includes: removing other portions of the transferring member other than the target transferring layer and at least a part of the target transferring layer to retain at least a part of the target transferring layer to form the optical device.

In the manufacturing method for the optical device according to the present application, the target transferring layer is a silicon crystal layer.

In the manufacturing method for the optical device according to the present application, the target transferring layer is a silicide layer.

In the manufacturing method for the optical device according to the present application, the optical device to be transferred is a semi-finished spectral chip, and the optical device is a spectral chip.

In the manufacturing method for the optical device according to the present application, the semi-finished spectral chip includes an image sensor and a signal-processing circuit layer.

In the manufacturing method for an optical device according to the present application, retaining at least a part of the target transferring layer of the transferring member to form the optical device includes: forming a light modulation structure on the retained target transferring layer to form the optical device.

In the manufacturing method for the optical device according to the present application, the target transferring layer of the transferring member has a light modulation structure formed therein.

In the manufacturing method for the optical device according to the present application, the transferring member is an SOI device, and the target transferring layer is a silicon crystal layer of the SOI device.

In the manufacturing method for the optical device according to the present application, providing the transferring member includes: providing a monocrystalline silicon structure; and processing the monocrystalline silicon structure to form the silicide layer within the monocrystalline silicon structure to form the transferring member.

In the manufacturing method for the optical device according to the present application, providing the transferring member includes: providing a base layer; and stacking the silicide layer on the base layer to form the transferring member.

In the manufacturing method for the optical device according to the present application, the optical device is a spectral chip, and the optical device to be transferred is a semi-finished spectral chip, and the target transferring layer is a silicon crystal layer.

In the manufacturing method for the optical device according to the present application, coupling the transferring member to the optical device to be transferred in such a way that the target transferring layer of the transferring member is bonded to the light-transmissive dielectric layer of the optical device to be transferred includes: forming a bonding layer on the surface of the silicon crystal layer of the transferring member, wherein the bonding layer is made of the same material as the light-transmissive dielectric layer; and coupling the transferring member to the semi-finished spectral chip in such a way that the bonding layer formed on the surface of the silicon crystal layer is bonded to the light-transmissive dielectric layer of the semi-finished spectral chip.

In the manufacturing method for the optical device according to the present application, the light-transmissive dielectric layer is made of silicide.

In the manufacturing method for the optical device according to the present application, forming the bonding layer on the surface of the silicon crystal layer of the transferring member, the bonding layer is made of the same material as the light-transmissive dielectric layer, includes: injecting anions on the surface of the silicon crystal layer, so that the part of the silicon crystal layer injected with the anions is converted into silicide to form the bonding layer on the surface of the silicon crystal layer.

In the manufacturing method for the optical device according to the present application, forming the bonding layer on the surface of the silicon crystal layer of the transferring member, the bonding layer is made of the same material as the light-transmissive dielectric layer, includes: stacking the bonding layer on the surface of the silicon crystal layer, wherein the bonding layer is made of the same material as the light-transmissive dielectric layer.

In the manufacturing method for the optical device according to the present application, the transferring member further includes a bonding layer formed on the surface of the silicon crystal layer of the transferring member, and the bonding layer is made of the same material as the light-transmissive dielectric layer; wherein coupling the transferring member to the optical device to be transferred in such a way that the target transferring layer of the transferring member is bonded to the light-transmissive dielectric layer of the optical device to be transferred includes: coupling the transferring member to the semi-finished spectral chip in such a way that the bonding layer formed on the surface of the silicon crystal layer is bonded to the light-transmissive dielectric layer of the semi-finished spectral chip.

In the manufacturing method for the optical device according to the present application, the upper surface of the light-transmissive dielectric layer is a flat surface.

In the manufacturing method for the optical device according to the present application, forming a light-transmissive dielectric layer on the surface of the semi-finished spectral chip includes: depositing the light-transmissive dielectric layer on the surface of the semi-finished spectral chip by a vapor deposition process; and processing the upper surface of the light-transmissive dielectric layer, so that the upper surface of the light-transmissive dielectric layer is a flat surface.

In the manufacturing method for the optical device according to the present application, before depositing the light-transmissive dielectric layer on the surface of the semi-finished spectral chip by a vapor deposition process, it further includes: pre-processing the surface of the semi-finished spectral chip, so that a part of the surface of the semi-finished spectral chip for depositing the light-transmissive dielectric layer is a flat surface.

In the manufacturing method for the optical device according to the present application, processing the upper surface of the light-transmissive dielectric layer, so that the upper surface of the light-transmissive dielectric layer is a flat surface, includes: polishing the upper surface of the light-transmissive dielectric layer by a chemical mechanical polishing process, so that the upper surface of the light-transmissive dielectric layer is a flat surface.

In the manufacturing method for the optical device according to the present application, the transferring member is an SOI device, which from bottom to top sequentially includes: a silicon base layer, a silicide layer, and the silicon crystal layer.

In the manufacturing method for the optical device according to the present application, retaining at least a part of the target transferring layer of the transferring member to form an optical device includes: removing the silicon base layer and the silicide layer of the transferring member to retain the silicon crystal layer.

In the manufacturing method for the optical device according to the present application, retaining at least a part of the target transferring layer of the transferring member to form an optical device includes: removing at least a part of the silicon base layer and the silicide layer of the transferring member to retain at least a part of the silicon crystal layer and the silicide layer.

In the manufacturing method for the optical device according to the present application, retaining at least a part of the target transferring layer of the transferring member to form an optical device further includes: forming a light modulation structure on the retained silicon crystal layer to form the spectral chip.

In the manufacturing method for the optical device according to the present application, the thickness of the retained silicon crystal layer is 50-750 nm.

In the manufacturing method for the optical device according to the present application, the thickness of the retained silicon crystal layer is 150-250 nm.

In the manufacturing method for the optical device according to the present application, the silicon crystal layer has a light modulation structure formed therein; wherein retaining at least a part of the silicon crystal layer of the transferring member to form a spectral chip includes: removing the silicon base layer and the silicide layer of the transferring member to retain the silicon crystal layer with the light modulation layer.

In the manufacturing method for the optical device according to the present application, the difference between the refractive index of the light modulation structure and that of the light-transmissive dielectric layer is greater than or equal to 0.5.

In the manufacturing method for the optical device according to the present application, the difference between the refractive index of the light modulation structure and that of the light-transmissive dielectric layer is greater than or equal to 0.7.

In the manufacturing method for the optical device according to the present application, the semi-finished spectral chip includes an image sensor and a signal-processing circuit layer.

In the manufacturing method for the optical device according to the present application, before coupling the transferring member to the optical device to be transferred in such a way that the target transferring layer of the transferring member is bonded to the light-transmissive dielectric layer of the optical device to be transferred, it further includes: forming at least one stress hole in the silicon crystal layer of the transferring member.

In the manufacturing method for the optical device according to the present application, retaining at least a part of the target transferring layer of the transferring member to form an optical device includes: removing at least a part of the silicon base layer and the silicide layer of the transferring member; and forming at least one stress hole in the silicon crystal layer of the transferring member.

In the manufacturing method for the optical device according to the present application, retaining at least a part of the target transferring layer of the transferring member to form an optical device; processing the upper surface of the light-transmissive dielectric layer, so that the upper surface of the light-transmissive dielectric layer is a flat surface, includes: repairing the upper surface of the light-transmissive dielectric layer by an atomic layer deposition process, so that the upper surface of the light-transmissive dielectric layer is a flat surface.

In the manufacturing method for the optical device according to the present application, forming a bonding layer on the surface of the silicon crystal layer of the transferring member includes: repairing the surface of the light-transmissive dielectric layer by an atomic layer deposition process, so that a part of the surface of the bonding layer for bonding with the light-transmissive dielectric layer is a flat surface.

According to another aspect of the present application, an optical device is also provided, wherein the optical device is manufactured by the above-mentioned manufacturing method.

Further objects and advantages of the present application will be fully embodied by understanding of the following description and accompanying drawings.

These and other objects, features and advantages of the present application are fully embodied by the following detailed description, drawings and the appended claims.

BRIEF DESCRIPTION OF THE DRAWINGS

The above and other objects, features and advantages of the present application will become more apparent through a more detailed description of the examples of the present application in conjunction with the accompanying drawings. The accompanying drawings are used to provide a further understanding of the examples of the present application, and constitute a part of the specification, and are used together with the examples of the present application to explain the present application, and do not constitute limitations to the present application. In the drawings, the same reference numerals generally represent the same components or steps.

DETAILED DESCRIPTION OF THE APPLICATION

Figure 1:
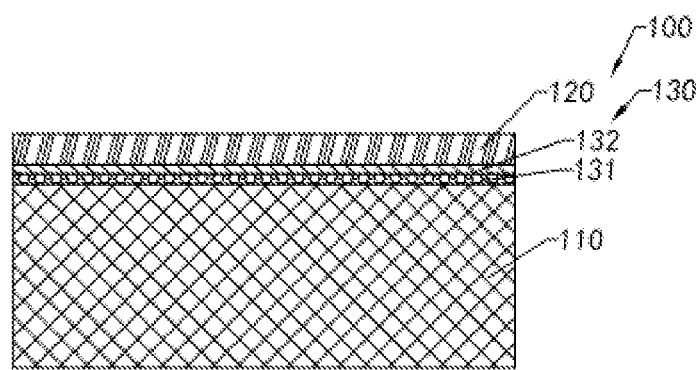
FIG. 1 shows a schematic diagram of an optical device according to an example of the present application.

Hereinafter, exemplary examples according to the present application will be described in detail with reference to the accompanying drawings. Apparently, the described examples are only some of the examples of the present application, rather than all the examples of the present application. It should be understood that the present application is not limited by the exemplary examples described herein.

Overview of the Application

As mentioned above, in actual industry, silicon crystals or silicon compounds are usually formed on the surface of an optical device by vapor deposition process to form an optical layer structure. However, an internal crystal orientation of silicon crystals and/or silicon compounds produced by the vapor deposition process is often irregular or not completely regular, which leads to poor optical properties of the silicon crystals and/or silicon compounds obtained by vapor deposition, thereby not meeting the application requirements.

Particularly, the optical layer structure formed by the vapor deposition process has technical problems such as low light transmittance and low refractive index.

At the same time, as mentioned above, in the semiconductor process, silicon crystals obtained by Czochralski method or floating zone melting method have very regular arrangement of internal atoms, i.e., relatively high crystal orientation regularity. Further, the silicon crystals are used as a basis to prepare silicon compounds (e.g., silicon dioxide, silicon nitride, etc.), and the internal crystal orientation of the silicon compounds is also regular. However, due to the limitations of the process per se, processes such as the Czochralski method or floating zone melting method cannot be directly applied to the preparation process of forming an optical layer structure on the surface of an optical device.

Based on this, the inventors of the present application conceived: whether the existing silicon crystals and/or silicon compounds with regular internal crystal orientation can be transferred to the surface of an optical device through a specific manufacturing process to form a target optical layer structure, so that the performance of the finally manufactured optical device can be guaranteed.

Based on this, the present application provides a manufacturing method for an optical device, including: providing a transferring member and an optical device to be transferred, wherein the transferring member includes a target transferring layer having a regular crystal orientation structure; forming a light-transmissive dielectric layer on the surface of the optical device to be transferred; coupling the transferring member to the optical device to be transferred in a way of bonding the target transferring layer of the transferring member to the light-transmissive dielectric layer of the optical device to be transferred; and retaining at least part of the target transferring layer of the transferring member to form the optical device. In this way, the manufacturing method transfers silicide or silicon compounds with better crystal orientation arrangement to the surface of the optical device to be transferred in a manner similar to physical transfer, so that the surface of the optical device finally manufactured has an optical layer structure with better crystal orientation arrangement.

After introducing the basic principle of the application, various non-limiting examples of the application will be specifically introduced below with reference to the accompanying drawings.

Exemplary Optical Device and Manufacturing Method Thereof

As shown in FIG. 1, an optical device 100 according to an example of the present application is illustrated, wherein the optical device 100 includes an optical device body 110 and an optical layer structure 120 formed on the surface of the optical device body 110 through a specific manufacturing procedure. In particular, the optical layer structure 120 has a regular crystal orientation structure, i.e., the arrangement of atoms inside the optical layer structure 120 is regular. Therefore, the optical layer structure 120 has excellent performance (e.g., has relatively excellent refractive index, transmittance, etc.), when the optical layer structure 120 is bonded to the surface of the optical device body 110, it can provide good performance support for the optical device body 110, so that the optical device 100 meets application requirements.

As shown in FIG. 1, in an example of the present application, the optical device 100 further includes a coupling layer 130 formed between the optical device body 110 and the optical layer structure 120, so that the optical layer structure 120 is stably combined with the optical device body 110 through the coupling layer 130, thereby forming the manufactured optical device 100.

Particularly, in an example of the present application, the coupling layer 130 includes a light-transmissive dielectric layer 131 disposed on the surface of the optical device body 110, wherein the upper surface of the light-transmissive dielectric layer 131 is a flat surface, so that the part at which the optical device body 110 and the optical layer structure 120 are combined is a flat surface through the light-transmissive dielectric layer 131, so as to facilitate the combination of the optical device body 110 and the optical layer structure 120. Further, as shown in FIG. 1, the coupling layer 130 further includes a bonding layer 132 disposed on the surface of the optical layer structure 120, wherein the bonding layer 132 and the light-transmissive dielectric layer 131 have a good bonding reaction between them, for example, in a specific example of the present application, the bonding layer 132 and the light-transmissive dielectric layer 131 can be made of the same material (e.g., made of silicide), so that the bonding layer 132 and the light-transmissive dielectric layer 131 have a good bonding reaction between them. Correspondingly, when the bonding layer 132 is bonded to the light-transmissive dielectric layer 131, a higher bonding force is formed between the bonding layer 132 and the light-transmissive dielectric layer 131, so that the optical device body 110 forms a stable combination relationship with the optical layer structure 120.

More particularly, in an example of the present application, the type of the optical device 100 is not limited by the present application, which includes but not limited to: active optical components (e.g., VCSEL chips, etc.), passive optical components (e.g., spectral chip, CCD photosensitive chip, CMOS photosensitive chip, etc.) etc. Correspondingly, the optical device body 110 can be implemented as a semi-finished product of the optical device 100 (e.g., a semi-finished spectral chip), i.e., the optical device body 110 per se is an incomplete product. Of course, in some examples of the application, the optical device body 110 per se can be implemented as a complete product, and the optical layer structure 120 is equivalent to optimizing the function of the product, or superimposing function on the basic function of the product. With respect to this, it is not limited by the present application.

The optical layer structure 120 is a silicon crystal layer, a silicide layer, or a combination layer 132 of the silicon crystal layer and silicide layer with a regular crystal orientation structure, which is formed on the surface of the optical device body 110 through a specific manufacturing procedure, thereby providing specific functional support for the optical component body through the optical layer structure 120. In a specific example, the optical layer structure 120 can be configured to have an optical modulation function, for example, when the optical device 100 is a spectral chip, the optical layer structure 120 can be configured to have a light modulation structure, so as to modulate the imaging light entering the spectral chip; as another example, when the optical device 100 is a VCSEL chip, the optical layer structure 120 can be configured to have a light diffusion function so as to diffusely modulate the emitted laser light. Of course, in other examples, the optical layer structure 120 is also used as a protective layer to prevent the optical device 100 from being scratched, prevent from being excessively exposed to the environment, and play a role of insulation. With respect to this, it is not limited by the present application.

As mentioned above, in the preparation process, since the processes such as Czochralski method or floating zone melting method which can form silicon crystals or silicide with regular crystal orientation, are not suitable for forming silicon crystals or silicide on the optical device 100, in the actual industry, silicon crystals or silicide are usually formed on devices by vapor deposition process. However, the internal atoms of silicon crystals or silicide obtained by vapor deposition process are not regularly arranged. Therefore, for some optical devices such as optical device 100 with special requirements, incompletely regular silicon crystals or silicide cannot guarantee the performance of the resulting optical device 100 meets preset requirements. For example, in the existing manufacturing method for spectral chips, a layer of silicon crystal is deposited on the photosensitive chip by vapor deposition method, and the silicon crystal is processed to obtain a light modulation structure, so that the light transmitted through the modulation layer is modulated. For the spectral chip, it is desirable that the refractive index of the modulation layer to be as high as possible, so the high transmittance can make the light loss small. However, the silicon crystal obtained by the vapor deposition method has poor crystal orientation regularity due to its atomic arrangement, so that the transmittance of the modulation layer is relatively low, and the overall modulation effect of the modulation layer is relatively poor.

Correspondingly, in an example of the present application, the optical device 100 is manufactured through a specific manufacturing method, wherein the manufacturing method transfers silicon crystals or silicide with a better crystal orientation arrangement to the surface of the optical device 100 to be transferred in a manner similar to physical transfer, so that the surface of the finally manufactured optical device 100 has an optical layer structure 120 with better crystal orientation arrangement.

Figure 2:
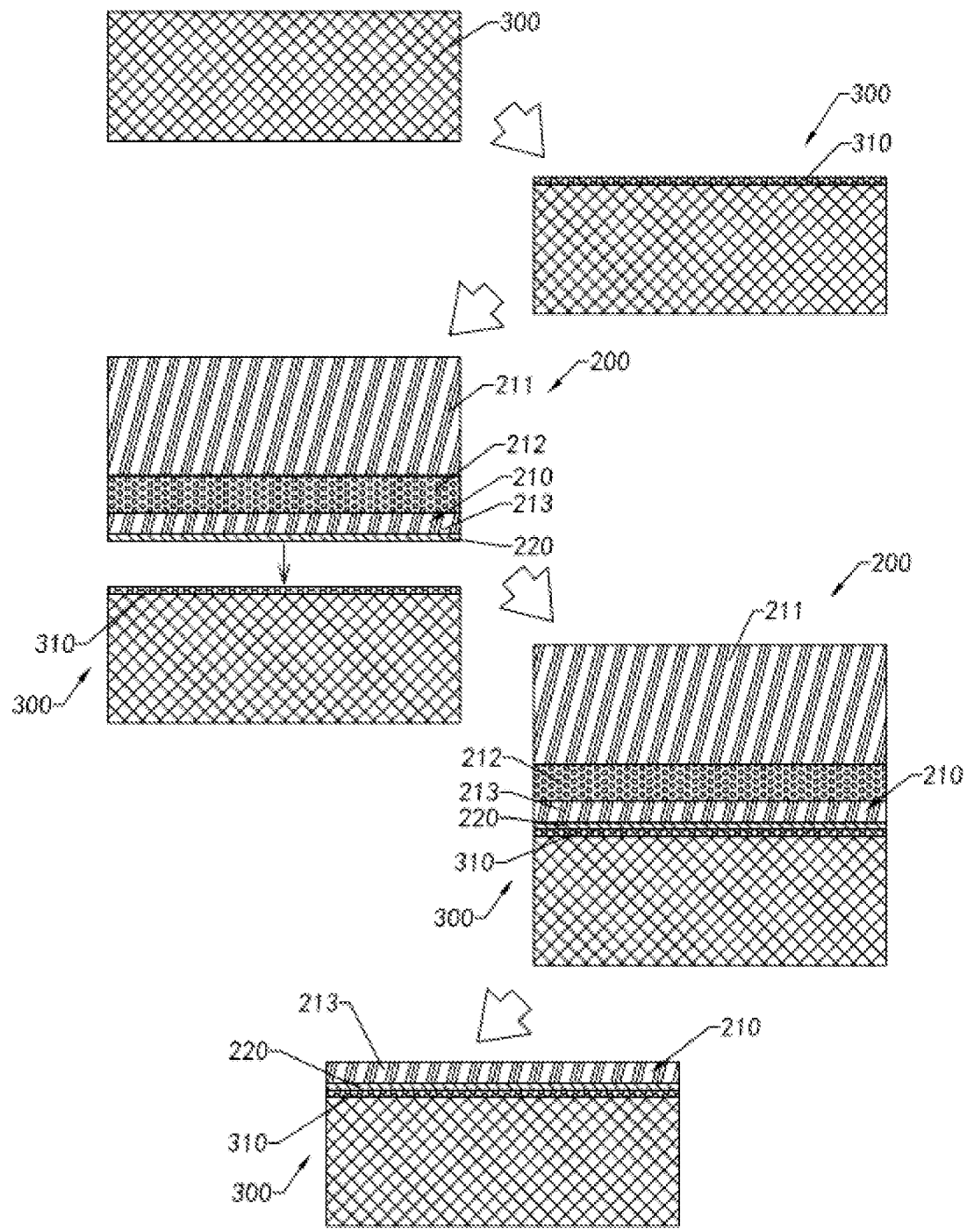
FIG. 2 shows a schematic diagram of a manufacturing procedure of the optical device according to an example of the present application.
Figure 3:
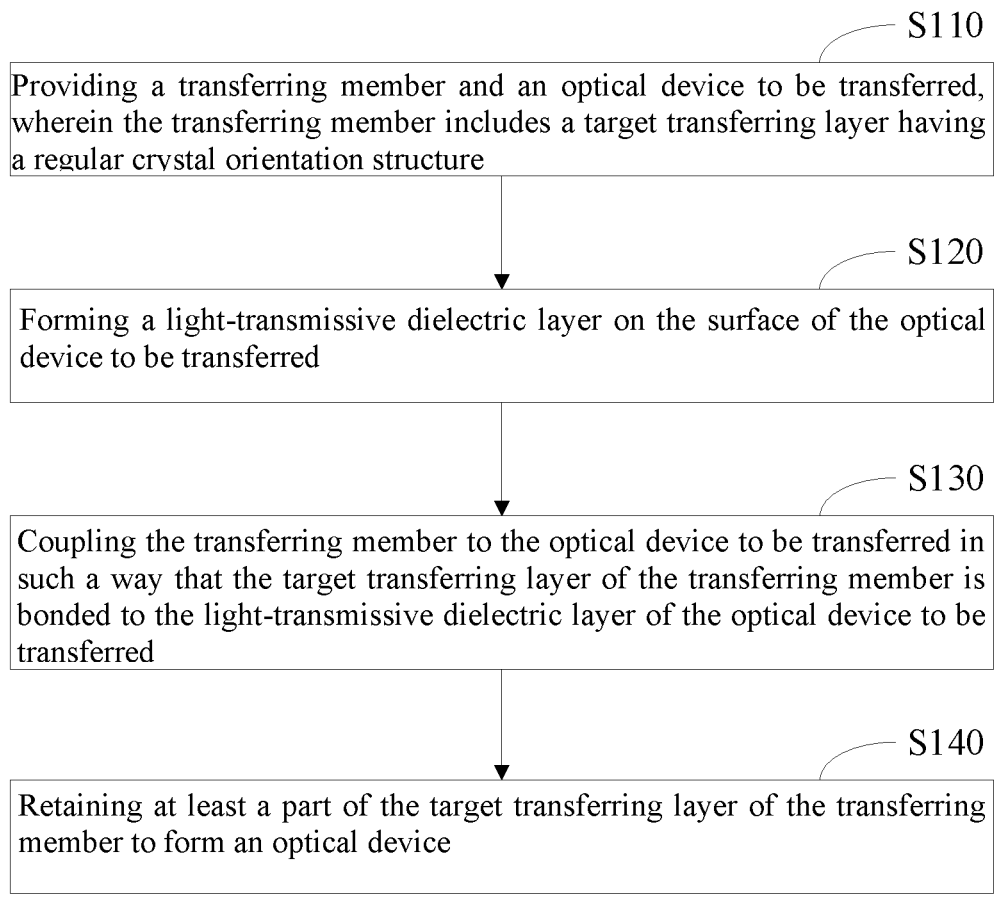
FIG. 3 shows a flow chart of a manufacturing method for the optical device according to an example of the present application.

FIG. 2 shows a schematic diagram of the manufacturing procedure of the optical device 100 according to an example of the present application. FIG. 3 shows a flow chart of the manufacturing method for an optical device 100 according to an example of the present application.

As shown in FIGS. 2 and 3, the manufacturing method for an optical device 100 according to an example of the present application includes the steps of: S110, providing a transferring member 200 and an optical device to be transferred 300, wherein the transferring member 200 includes a target transferring layer 210 having a regular crystal orientation structure; S120, forming a light-transmissive dielectric layer 310 on the surface of the optical device to be transferred 300; S130, coupling the transferring member 200 to the optical device to be transferred 300 in such a way that the target transferring layer 210 of the transferring member 200 is bonded to the light-transmissive dielectric layer 310 of the optical device to be transferred 300; and S140, retaining at least a part of the target transferring layer 210 of the transferring member 200 to form the optical device.

In step S110, the transferring member 200 and the optical device to be transferred 300 are provided, wherein the transferring member 200 includes a target transferring layer 210 having a regular crystal orientation structure. Correspondingly, in an example of the present application, the optical device to be transferred 300 is the optical device body 110 as described above, which is the main part of the optical device. The transferring member 200 includes a target transferring layer 210 with a regular crystal orientation structure, i.e., the transferring member 200 includes an optical layer structure with a regular crystal orientation structure.

Correspondingly, the technical key of the manufacturing method according to an example of the present application lies in: transferring the target transferring layer 210 of the transferring member 200 to the surface of the optical device to be transferred 300. During the transferring process, not only how to transfer the target transferring layer 210 to the surface of the optical device to be transferred 300 should be considered, but also the followings should be considered: what structure the transferring member 200 with the target transferring layer 210 has; and how to prepare the transferring member 200 with the target transferring layer 210; how to ensure that the target transferring layer 210 can be stably and fitly bonded to the surface of the optical device to be transferred 300; if the transferring member 200 includes structures other than the target transferring layer 210, it is necessary to consider technical issues such as how to remove the redundant part of the transferring member 200 after the transferring member 200 is bonded to the surface of the optical device to be transferred 300.

As mentioned above, in an example of the present application, the optical layer structure is a silicon crystal layer 213 or a silicide layer 212 with a regular crystal orientation structure. Correspondingly, in an example of the present application, the target transferring layer 210 of the transferring member 200 is a silicon crystal layer 213 or a silicide layer 212.

In a particular implementation, the transferring member 200 may only include the target transferring layer 210, i.e., the transferring member 200 per se is the target transferring layer 210, i.e., the transferring member 200 is a silicon crystal layer 213 (or a silicon base layer 211) or a silicide layer 212. Those of ordinary skill in the art should know that in the field of semiconductors, a monocrystalline silicon base is usually used as a substrate, and other components are formed on the substrate, and simple monocrystalline silicon or simple silicide is seldom directly applied. Correspondingly, in the particular implementation of the present application, the transferring member 200 usually includes other layer structures besides the target transferring layer 210.

Particularly, when the target transferring layer 210 is a silicon crystal layer 213, the transferring member 200 can be selected as an existing SOI device (silicon on insolation). That is to say, in the manufacturing method according to an example of the present application, an ready-made device including the target transferring layer 210 can be used as the transferring member 200, which can reduce the cost on the one hand, and on the other hand the technical development of the existing device has matured with stable and predictable performance.

Figure 4A:
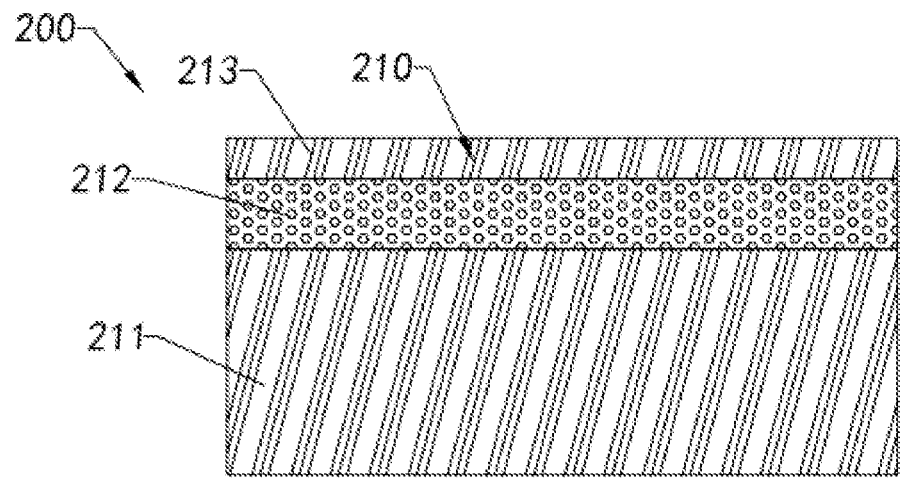
FIG. 4A shows a schematic diagram of an example of a transferring member in the manufacturing procedure of the optical device according to an example of the present application.

FIG. 4A shows a schematic diagram of an example of the transferring member 200 in the manufacturing procedure of the optical device according to an example of the present application. As shown in FIG. 4A, the transferring member 200 is implemented as an existing SOI device, which from bottom to top sequentially includes: a silicon base layer 211, a silicide layer 212, and a silicon crystal layer 213; wherein the silicon crystal layer 213 at the uppermost layer is the target transferring layer 210.

Figure 4B:
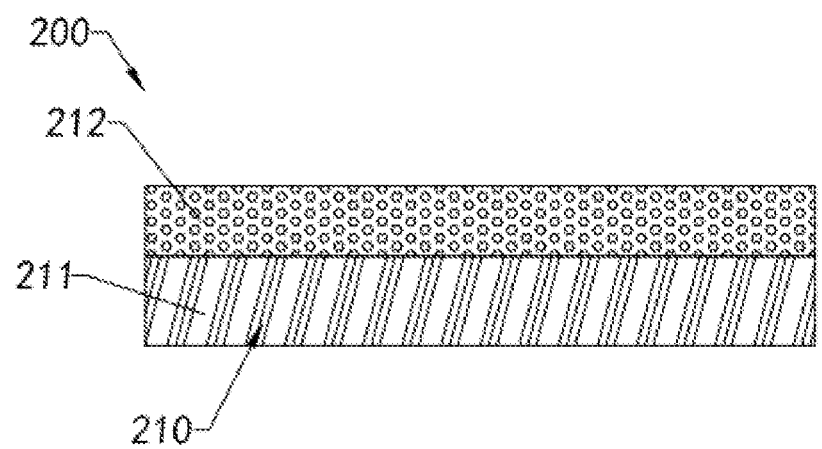
FIG. 4B shows a schematic diagram of another example of the transferring member in the manufacturing procedure of the optical device according to an example of the present application.

Of course, when the target transferring layer 210 is the silicon crystal layer 213, the transferring member 200 may also be a non-ready-made device, i.e., the transferring member 200 is a self-made device. FIG. 4B shows a schematic diagram of another example of the transferring member 200 in the manufacturing procedure of the optical device according to an example of the present application. As shown in FIG. 4B, the transferring member 200 is implemented as a self-made device, which from bottom to top includes: a silicon base layer 211 and a silicide layer 212, wherein the silicon base layer 211 is the target transferring layer 210.

Particularly, the transferring member 200 as shown in FIG. 4B can be manufactured in the following manner. Particularly, firstly a monocrystalline silicon structure is provided, for example, the monocrystalline silicon structure is obtained by adopting Czochralski method or floating zone melting method. Next, the monocrystalline silicon structure is processed to form the silicide layer 212 in the monocrystalline silicon structure so as to form the transferring member 200, for example, implanting anions (such as, oxygen ions or nitrogen ions) to form the silicide layer 212 in the monocrystalline silicon structure. Correspondingly, after the anions are implanted, the part of the single crystal structure that is not implanted with anions forms the silicon base layer 211, and the part that is implanted with the anions forms the silicide layer 212, wherein the anions include but not limited to oxygen ions, nitrogen ions, etc.

It should be understood that the arrangement of the internal atoms of the monocrystalline silicon structure obtained by Czochralski method or floating zone melting method is very regular, i.e., it has relatively high crystal orientation regularity. Further, the silicon compounds prepared on the basis of the single silicon crystal also has regular internal crystal orientation.

Of course, other methods can also be used to manufacture the transferring member 200 as shown in FIG. 4B. For example, firstly a silicon base layer 211 is provided, and similarly, the silicon base layer 211 can be obtained by Czochralski method or floating zone melting method. Then, the silicide layer 212 is laminated on the base layer through an adhesive to form the transferring member 200.

Figure 4C:
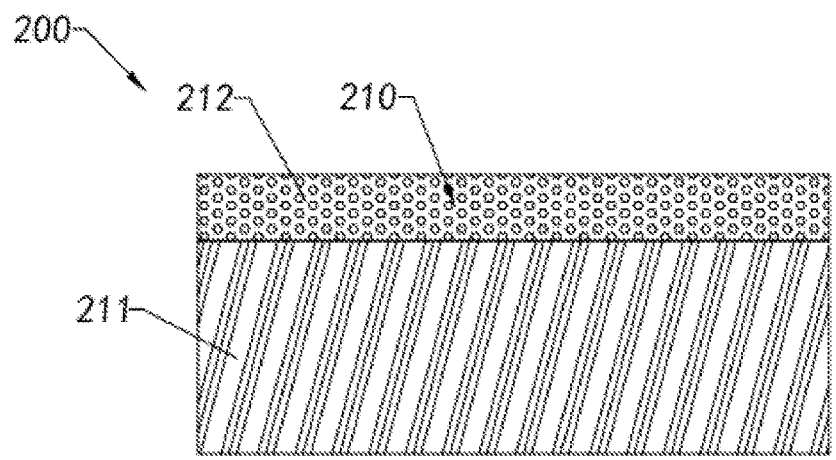
FIG. 4C shows a schematic diagram of still another example of the transferring member in the manufacturing procedure of the optical device according to an example of the present application.

Correspondingly, when the target transferring layer 210 is a silicide layer 212, the transferring member 200 can also be implemented as a structure as shown in FIG. 4B, i.e., the transferring member 200 includes the silicon base layer 211 and the silicide layer 212 formed on the silicon base layer 211, wherein the silicide layer 212 is the target transferring layer 210, as shown in FIG. 4C.

Figure 4D:
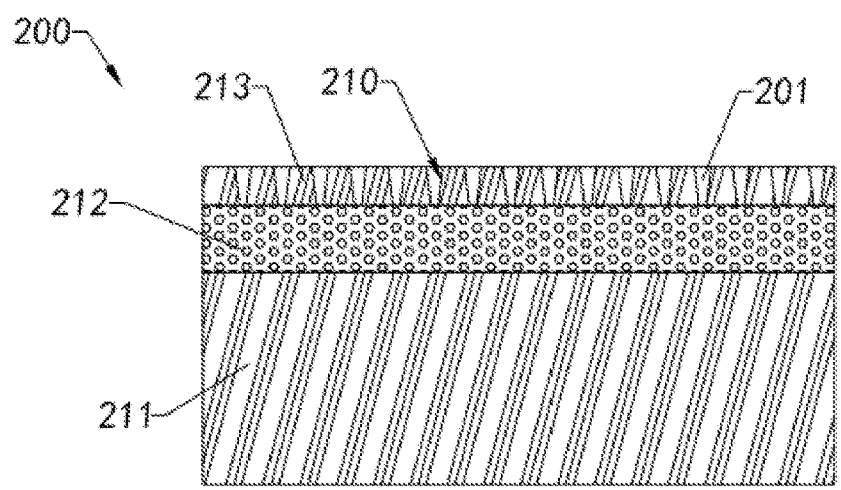
FIG. 4D shows a schematic diagram of yet another example of the transferring member in the manufacturing procedure of the optical device according to an example of the present application.
Figure 4E:
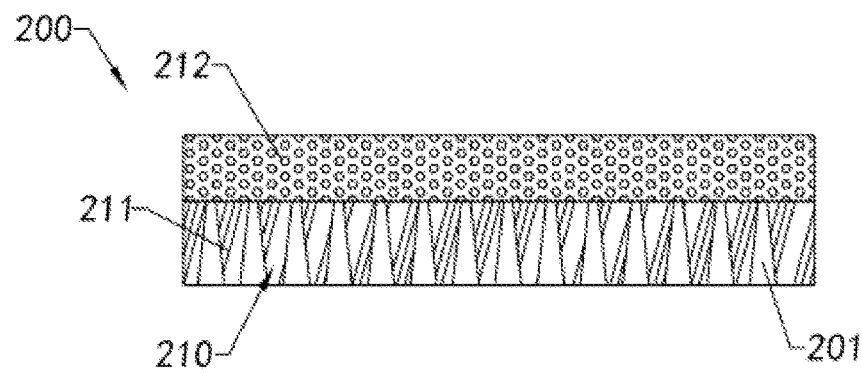
FIG. 4E shows a schematic diagram of yet another example of the transferring member in the manufacturing procedure of the optical device according to an example of the present application.

As mentioned above, in some examples of the present application, the optical layer structure of the optical device can be configured to have an optical modulation function, for example, when the optical device is a spectral chip, the optical layer structure can be configured to have a light modulation structure to modulate the imaging light entering the spectral chip. Accordingly, in these examples, the light modulation structure may be prefabricated on the target transferring layer 210 of the transferring member 200. For example, when the target transferring layer 210 is a silicon crystal layer 213, the silicon crystal layer 213 of the SOI device as shown in FIG. 4A can be processed to form light modulation structure 201 in the silicon crystal layer 213, so as to form the transferring member 200 as shown in FIG. 4D. Of course, when the target transferring layer 210 is a silicon crystal layer 213, the target transferring layer 210 of the transferring member 200 as shown in FIG. 4B can also be processed, so that the target transferring layer 210 has the light modulation structure 201 to form the transferring member 200 as shown in FIG. 4E.

In the example of the present application, the target transferring layer 210 of the transferring member 200 may also be processed in the subsequent step S140, so as to form the optical modulation structure. With respect to this, it is not limited by the present application.

In step S120, a light-transmissive dielectric layer 310 is formed on the surface of the optical device to be transferred 300. Herein, the light-transmissive dielectric layer 310 can be made of a transparent material, for example, silicide (including but not limited to silicon dioxide, silicon nitride and other silicide). The light-transmissive dielectric layer 310 can be integrally formed on the surface of the optical device to be transferred 300 by a non-metallic vapor deposition process. Of course, in other examples of the present application, other processes may also be used to form the light-transmissive dielectric layer 310 on the surface of the optical device to be transferred 300, for example, bonding, attaching, and the like.

In particular, in an example of the present application, the upper surface of the light-transmissive dielectric layer 310 is a flat surface. It should be understood that, in an example of the present application, the part where the optical device to be transferred 300 is combined with the transferring member 200 is the upper surface of the light-transmissive dielectric layer 310. Therefore, when the upper surface of the light-transmissive dielectric layer 310 is a flat surface, it means that a flat bonding surface is formed on the outer surface of the optical device to be transferred 300, so as to facilitate the stable bonding between the optical device to be transferred 300 and the target transferring layer 210 of the transferring member 200.

Of course, in a particular implementation, the surface of the optical device to be transferred 300 may be uneven, and at the same time, the upper surface of the light-transmissive dielectric layer 310 may also be uneven. Therefore, in some examples of the present application, the process of forming a light-transmissive dielectric layer 310 on the surface of the optical device to be transferred 300 includes: firstly pre-processing the surface of the optical device to be transferred 300, so that the part in the surface of the optical device to be transferred 300 where the light-transmissive dielectric layer 310 is deposited is a flat surface, which facilitates to form the light-transmissive dielectric layer 310 on the surface of the optical device to be transferred 300. Next, the light-transmissive dielectric layer 310 is deposited on the surface of the optical device to be transferred 300 by a vapor deposition process. Then, the upper surface of the light-transmissive dielectric layer 310 is processed, so that the upper surface of the light-transmissive dielectric layer 310 is a flat surface.

In a particular implementation, the process of processing the upper surface of the light-transmissive dielectric layer 310 so that the upper surface of the light-transmissive dielectric layer 310 is a flat surface includes: polishing the upper surface of the light-transmissive dielectric layer 310 by a chemical mechanical polish (CMP) process, so that the upper surface of the light-transmissive dielectric layer 310 is a flat surface.

It is worth mentioning that, in some of the optical devices to be transferred 300 in the present application, if the surface of the optical device to be transferred 300 is a flat surface, the light-transmissive dielectric layer 310 also may not be formed on the surface of the optical device to be transferred 300, i.e., in some special examples of the present application, step S120 may not be performed.

In step S130, the transferring member 200 is coupled to the optical device to be transferred 300 in such a way that the target transferring layer 210 of the transferring member 200 is bonded to the light-transmissive dielectric layer 310 of the optical device to be transferred 300. That is to say, in an example of the present application, the transferring member 200 is stably coupled to the optical device to be transferred 300 by a bonding process.

In order to ensure the bonding effect, preferably, the surface of the transferring member 200 to be used for bonding to the light-transmissive dielectric layer 310 can generate a good bonding reaction with the light-transmissive dielectric layer 310, so that the overall bonding force is larger, thereby ensuring the overall reliability. Those of ordinary skill in the art should know that, the bonding effect between the same materials is better. Therefore, in an example of the present application, preferably, before bonding the target transferring layer 210 of the transferring member 200 to the light-transmissive dielectric layer 310 of the optical device to be transferred 300, preferably, on the surface of the target transferring layer 210 of the transferring member 200, a binding layer with the same material as that of the light-transmissive dielectric layer 310 is arranged on the surface of the target transferring layer 210 of the transferring member 200.

In a specific example of the present application, the bonding layer can be prefabricated on the target transferring layer 210 of the transferring member 200, i.e., in this specific example, the bonding layer is a part of the transferring member 200 per se. In this way, during the process of bonding the target transferring layer 210 of the transferring member 200 to the light-transmissive dielectric layer 310 of the optical device to be transferred 300, the bonding layer formed on the surface of the target transferring layer 210 is bonded to the light-transmissive dielectric layer 310 of the optical device to be transferred 300, so that the transferring member 200 is stably coupled to the optical device to be transferred 300.

In another specific example of the present application, before bonding the target transferring layer 210 of the transferring member 200 to the light-transmissive dielectric layer 310 of the optical device to be transferred 300, a bonding layer 220 is formed on the surface of the target transferring layer 210 of the member 200. In a particular implementation, the surface of the target transferring layer 210 can be processed to form the bonding layer 220 on the upper surface of the target transferring layer 210 of the transferring member 200, and the bonding layer 220 is made of the same material as that of the light-transmissive dielectric layer 310. For example, when the light-transmissive dielectric layer 310 is a silicon dioxide layer, oxygen ions can be implanted into the upper surface of the target transferring layer 210 to form the bonding layer 220 on the surface of the target transferring layer 210 of the transferring member 200, wherein the bonding layer 220 is made of silicon dioxide. Of course, in other implementations, the bonding layer 220 may also be formed on the upper surface of the target transferring layer 210 in a stacked manner, and the bonding layer 220 is made of the same material as that of the light-transmissive dielectric layer 310. With respect to this, it is not limited by the present application.

Further, if the bonding portions of the light-transmissive dielectric layer 310 and the bonding layer 220 (target transferring layer 210) are uneven, the modulation effect of the transmitted light will be affected, for example, a gap may be generated at the bonding portions, which may cause interference of the incident light. Therefore, in this application, it is necessary to ensure that the bonding portions or the bonding planes have flatness requirements, preferably its flatness is less than or equal to 15 μm. Particularly, after the light-transmissive dielectric layer 310, the bonding layer 220 and/or target transferring layer 210 are formed, they are washed and cleaned; further, if there is a pit, a process similar to ALD (atomic layer deposition) can be adopted to deposit it on the surface through a slow or relatively slow deposition method, and the pit is filled by using the fluidity of the deposition material on the surface, thereby making the surface even. If there are protrusions, chemical cleaning needs to be considered to remove the protrusions so as to ensure a smooth surface. Due to the high consistency of the products produced by the same process and equipment, for those that can take a single transferring member 200 and optical device to be transferred 300 for testing, only a few transferring members 200 and optical device to be transferred 300 need to be taken to perform a flatness test on the bonding surface.

In step S140, at least a part of the target transferring layer 210 of the transferring member 200 is retained to form the optical device. It should be understood that for the optical device, the target transferring layer 210 is a desired optical layer structure for use. Therefore, in an example of the present application, if the transferring member 200 includes other layer structures besides the target transferring layer 210, it is also necessary to remove unnecessary portions of the transferring member 200 and retain at least a part of the target transferring layer 210 of the transferring member 200.

In a particular implementation, if the target transferring layer 210 is a silicon crystal layer 213, and the transferring member 200 is implemented as a structure shown in FIG. 4A, in step S140, the process of retaining at least a part of the target transferring layer 210 of the transferring member 200 includes: removing the silicon base layer 211 and the silicide layer 212 of the transferring member 200 to completely expose the target transferring layer 210. That is to say, the silicon base layer 211 and the silicide layer 212 of the transferring member 200 are removed, and the target transferring layer 210 is completely retained. Certainly, in a particular implementation, in order to meet the requirement of thickness dimension, a part of the silicon crystal layer 213 may be further removed. With respect to this, it is not limited by the present application.

Those of ordinary skill in the art should know that, the silicide layer 212 in the transferring member 200 has stable physical and chemical properties. Therefore, in a particular implementation, part of the silicide layer 212 can also be retained to protect the silicon crystal layer 213 (the target transferring layer 210) by the silicide layer 212; further, the retention of the silicide layer 212 can increase the thickness and complexity of the target transferring layer 210. In terms of thickness, the reliability of the target transferring layer 210 can be improved; and in terms of complexity, the silicon crystal layer 213 and the silicide layer 212 have different optical properties, so the modulation effect will be better after incident light enters.

In a particular implementation, if the target transferring layer 210 is a silicon crystal layer 213, and the transferring member 200 is implemented as a structure shown in FIG. 4B, in step S140, the process of retaining at least a part of the target transferring layer 210 of the transferring member 200 to form the optical device includes: removing the silicide layer 212 of the transferring member 200 to expose the target transferring layer 210. That is to say, the silicide layer 212 of the transferring member 200 is removed, and the silicon crystal layer 213 is completely retained. Those of ordinary skill in the art should know that, the silicide layer 212 in the transferring member 200 has stable physical and chemical properties. Therefore, in a particular implementation, part of the silicide layer 212 can also be retained to protect the silicon crystal layer 213 (the target transferring layer 210) by the silicide layer 212.

In a particular implementation, if the target transferring layer 210 is a silicide layer 212, and the transferring member 200 is implemented as a structure shown in FIG. 4B, in step S140, the process of retaining at least a part of the target transferring layer 210 of the transferring member 200 includes: removing the silicon base layer 211 of the transferring member 200 to expose the target transferring layer

210. That is to say, the silicon base layer 211 of the transferring member 200 is removed, and the silicide layer 212 is completely retained.

In the above particular implementation, mechanical grinding, chemical mechanical polishing, corrosion process, etc. can be used to remove the part of the transferring member 200 that needs to be removed. Of course, those of ordinary skill in the art should know that mechanical grinding is efficient but the precision is poor, while chemical mechanical polishing and corrosion process are slow in efficiency but high in precision. Therefore, in specific processes, mechanical grinding can be firstly used for rough processing, then chemical mechanical polishing or corrosion process is used for finish processing to take into account both efficiency and precision.

As mentioned above, in some examples of the present application, the optical layer structure of the optical device can be configured to have an optical modulation function. For example, when the optical device is a spectral chip, the optical layer structure can be configured to have a light modulation structure 201 to modulate the imaging light entering the spectral chip.

Accordingly, in these examples, after retaining at least a part of the target transferring layer 210 of the transferring member 200, the retained target transferring layer 210 may be further processed to form the light modulation structure 201 in the target transferring layer 210. For example, when the transferring member 200 is a structure as shown in FIG. 4A, after removing the silicon base layer 211 and the silicide layer 212 of the transferring member 200 to retain at least a part of the silicon crystal layer 213, the silicon crystal layer 213 is further processed by an etching process, nanoimprinting process, etc. to form the light modulation structure 201.

Particularly, a flow chart of the specific technological process of nano-screen printing process is as follows: firstly coating photosensitive material (e.g., photoresist) on the metal film surface of the wafer; then pressing a template with the filter pattern engraved on it, especially the template is transparent; next, ultraviolet light (UV light) is irradiated thereto to harden the photoresist on which the template pattern has been printed. The template is then peeled off to reveal the photoresist printed with patterns.

That is to say, in some examples of the present application, the process of retaining at least a part of the target transferring layer 210 of the transferring member 200 further includes: forming a light modulation structure 201 on the retained target transferring layer 210 to form the optical device.

Certainly, in some examples of the present application, if the light modulation structure 201 is prefabricated in the target transferring layer 210 of the transferring member 200, during the process of remaining at least a part of the target transferring layer 210 of the transferring member 200, the light modulation structure is also exposed simultaneously.

In summary, the manufacturing method for the optical device according to an example of the present application is clarified, wherein the silicon crystals or silicide with better crystal orientation arrangement are transferred to the surface of the optical device to be transferred 300 in a manner similar to physical transfer, so that the surface of the finally manufactured optical device have an optical layer structure with better crystal orientation arrangement.

Specific Example 1

Figure 5:
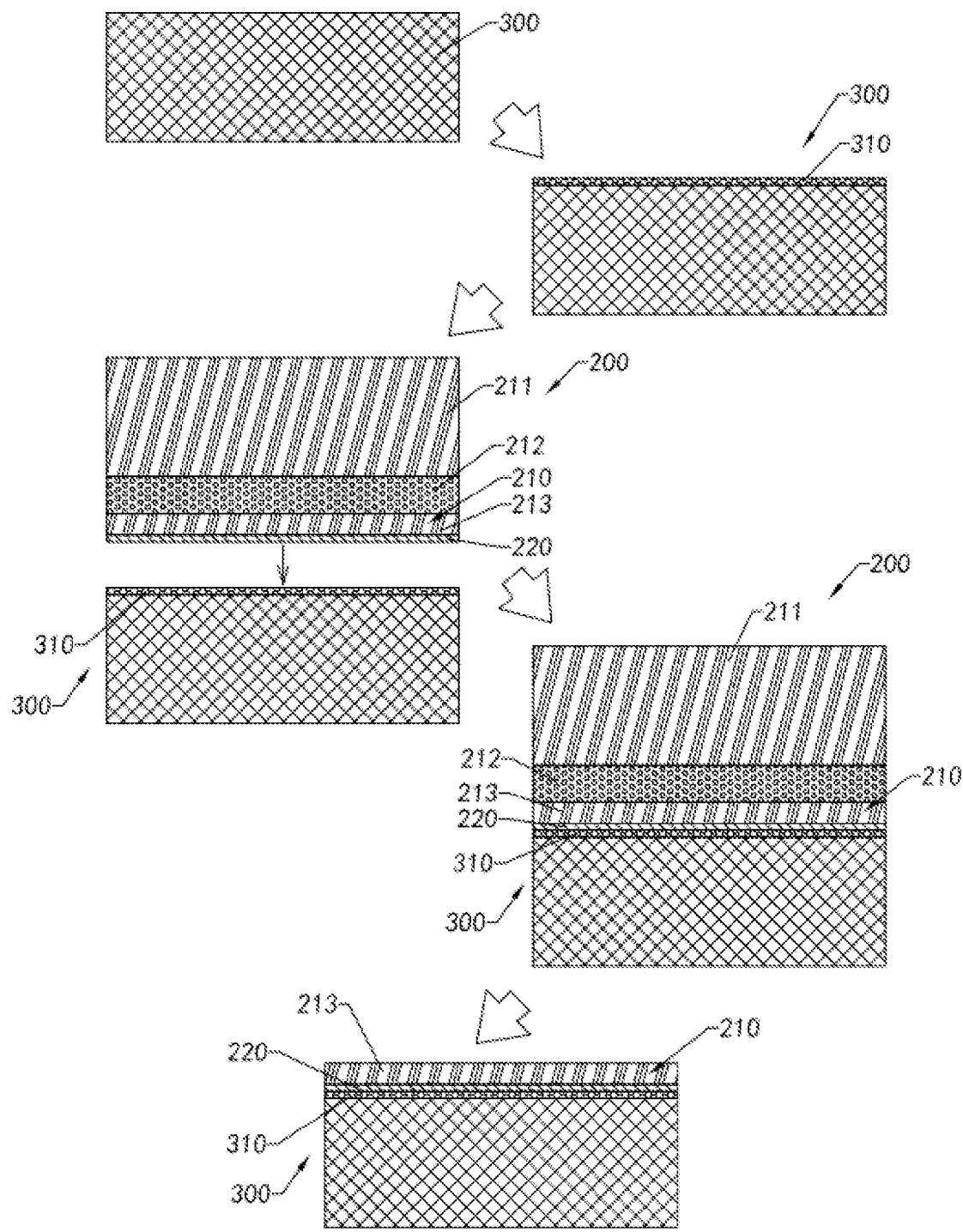
FIG. 5 shows a schematic diagram of Specific Example 1 of the optical device and the manufacturing method for an optical device according to an example of the present application.

FIG. 5 shows a schematic diagram of a specific example of the optical device and the manufacturing method for the optical device according to an example of the present application. As shown in FIG. 5, in this specific example, the object of the manufacturing method is: to form a silicon crystal layer 213 with a regular crystal orientation structure on the surface of the optical device.

As shown in FIG. 5, in this specific example, the manufacturing procedure of the optical device includes: firstly performing preprocessing on the surface of the optical device to be transferred 300, so as to form a flat bonding plane on the surface of the optical device to be transferred 300 for bonding to the transferring member 200.

Particularly, in this specific example, the process of preprocessing the surface of the optical device to be transferred 300 includes: forming a light-transmissive dielectric layer 310 on the surface of the optical device to be transferred 300, wherein the light-transmissive dielectric layer 310 is made of a light-transmissive material and has a relatively high light transmittance, so that it will not affect light entering the optical device to be transferred 300. In this specific example, preferably the material of the light-transmissive dielectric layer 310 is silicide, for example, silicon dioxide, silicon nitride, and the like. In a particular implementation, the light-transmissive dielectric layer 310 can be formed on the surface of the optical device to be transferred 300 by, for example, a non-metallic vapor deposition process. Of course, in other implementations of this particular example, the light-transmissive dielectric layer 310 can also be formed by other processes. With respect to the forming process, it is not limited by the present application.

As shown in FIG. 5, preferably, in this specific example, the upper surface of the light-transmissive dielectric layer 310 is a flat surface, or in other words, the part of the upper surface of the light-transmissive dielectric layer 310 used for bonding to the transferring member 200 has a relatively high flatness, so as to facilitate transferring the transferring member 200 onto the optical device to be transferred 300.

It is worth mentioning that, in some cases of this specific example, the surface of the optical device to be transferred 300 may be uneven, and the upper surface of the light-transmissive dielectric layer 310 formed on the surface of the optical device to be transferred 300 by a deposition process may also be uneven. Therefore, in this particular implementation, the preprocessing also includes: polishing the surface of the optical device to be transferred 300, and/or polishing the upper surface of the light-transmissive dielectric layer 310. Herein, the polishing process may be a chemical mechanical polish process, or other processes capable of increasing the flatness of a surface, such as the above-mentioned ALD, chemical cleaning, etc. With respect to this, it is not limited by the present application.

As shown in FIG. 5, the manufacturing procedure of the optical device further includes: providing a transferring member 200. In particular, in this specific example, the transferring member 200 is an SOI device (silicon on insolation), which from bottom to top sequentially includes: a silicon base layer 211, a silicide layer 212 and a silicon crystal layer 213, wherein the silicon crystal layer 213 is the target transferring layer 210 of the transferring member 200, i.e., in this specific example, the target transferring layer 210 of the transferring member 200 is located at the upper layer of the transferring member 200. Those of ordinary skill in the art should know that, the SOI device is an existing component, and a ready-made device including the target transferring layer 210 is used as the transferring member 200, so that the cost can be reduced on the one hand, and on the other hand, the technology development of the existing device has matured with stable and predictable performance.

Moreover, those of ordinary skill in the art should know that in the SOI device, the arrangement of atoms in the silicon base layer 211, the silicide layer 212, and the silicon crystal layer 213 is regular, i.e., all of the three have good crystal orientation structure.

Preferably, in this specific example, the surface of the silicon crystal layer 213 is a flat surface.

As shown in FIG. 5, the manufacturing procedure of the optical device further includes: coupling the SOI device to the optical device to be transferred 300 in such a way that the upper surface of the SOI device is bonded to the upper surface of the light-transmissive dielectric layer 310 of the optical device to be transferred 300; i.e., transferring the SOI device to the optical device to be transferred 300 in such a way that the surface of the silicon crystal layer 213 of the SOI device is bonded to the upper surface of the light-transmissive dielectric layer 310 of the optical device to be transferred 300.

In order to ensure the bonding strength between the SOI device and the optical device to be transferred 300, preferably, in an example of the present application, the upper surface of the SOI device preferably has a good bonding reaction with the light-transmissive dielectric layer 310, so that the two can produce a good bonding reaction when bonding, thereby resulting in greater bonding force. For example, in this specific example, the upper surface of the SOI device is made of the same material as the light-transmissive dielectric layer 310, so that the two can produce a good bonding reaction when bonding, thereby resulting in a larger bonding force.

Taking the light-transmissive dielectric layer 310 to be made of silicon dioxide as an example, it should be understood that the upper surface of the SOI device is formed by the surface of the silicon crystal layer 213. Therefore, in this particular implementation, before bonding the upper surface of the SOI device to the upper surface of the light-transmissive dielectric layer 310, it further includes: processing the upper surface of the SOI device, so that the upper surface of the SOI device is made of silicon dioxide material.

In a particular implementation, oxygen ions can be implanted into the surface of the silicon crystal layer 213 to form a silicon dioxide layer on the surface of the silicon crystal layer 213, so that the upper surface of the SOI device is made of silicon dioxide. It should be understood that the silicon crystal layer 213 has a regular crystal orientation structure; therefore, the silicon dioxide layer also has a regular crystal orientation structure, so as to improve its bonding effect with the light-transmissive dielectric layer 310.

Of course, in other implementations of this specific example, the bonding layer 220 can also be stacked on the surface of the silicon crystal layer 213, wherein the bonding layer 220 is made of silicon dioxide material, for example, the bonding layer 220 is formed on the surface of the silicon crystal layer 213 by superimposition through non-metal vapor deposition process, so as to improve the bonding strength between the transferring member 200 and the optical device to be transferred 300 through the bonding layer 220.

It is worth mentioning that, in this specific example, the process of processing the upper surface of the SOI device can also be completed in the step of providing the transferring member 200. With respect to this, it is not limited by the present application.

As shown in FIG. 5, the manufacturing procedure of the optical device further includes: removing the silicon base layer 211 and retaining at least a part of the silicide layer 212 and the silicon crystal layer 213. In this specific example, the silicon base layer 211 may be removed by one or a combination of mechanical grinding, chemical mechanical polishing, and etching.

It is worth mentioning that, mechanical grinding has high efficiency but poor precision, while chemical mechanical polishing and etching processes have low efficiency but high precision. Therefore, in this specific example, it is preferable to use mechanical grinding to polish the silicon base layer 211 as the first-stage processing, and then perform the second-stage processing on the silicon base layer 211 by chemical mechanical polishing or etching process, so that the processed surface is a flat surface. In this specific example, the atomic arrangement of the silicon crystal layer 213 is regular, which can ensure the performance of the optical device and retain the silicide layer 212, wherein the silicon crystal layer 213 is protected by utilizing the stability of the silicide layer 212.

In other solutions of this specific example, the manufacturing procedure of the optical device further includes: removing the silicide layer 212, so that the silicon crystal layer 213 is exposed, i.e., further performing processing of the transferring member 200 so that all parts of the transferring member 200 except the target transferring layer 210 are removed, thereby the target transferring layer 210 is exposed. It should be understood that, since the silicon crystal layer 213 is formed by the Czochralski method, its internal atomic arrangement and crystal direction are regular, and the internal structure of the silicon crystal layer 213 will not change during the transfer process of the transferring member 200. Therefore, the silicon crystal layer 213 finally formed on the surface of the optical device has a regular crystal orientation structure.

In another solution of this specific example, the manufacturing procedure of the optical device further includes: removing at least a part of the exposed silicon crystal layer 213, i.e., further processing the exposed silicon crystal layer 213 so as to make the silicon crystal layer 213 thinner.

In summary, the optical device and a manufacturing method thereof based on this specific example are clarified, wherein a specific manufacturing method is used to transfer the silicon crystal layer 213 with a better crystal orientation arrangement to the surface of the optical device to be transferred 300, so that the surface of the finally manufactured optical device has an optical layer structure with better crystal orientation arrangement.

Specific Example 2

Figure 6:
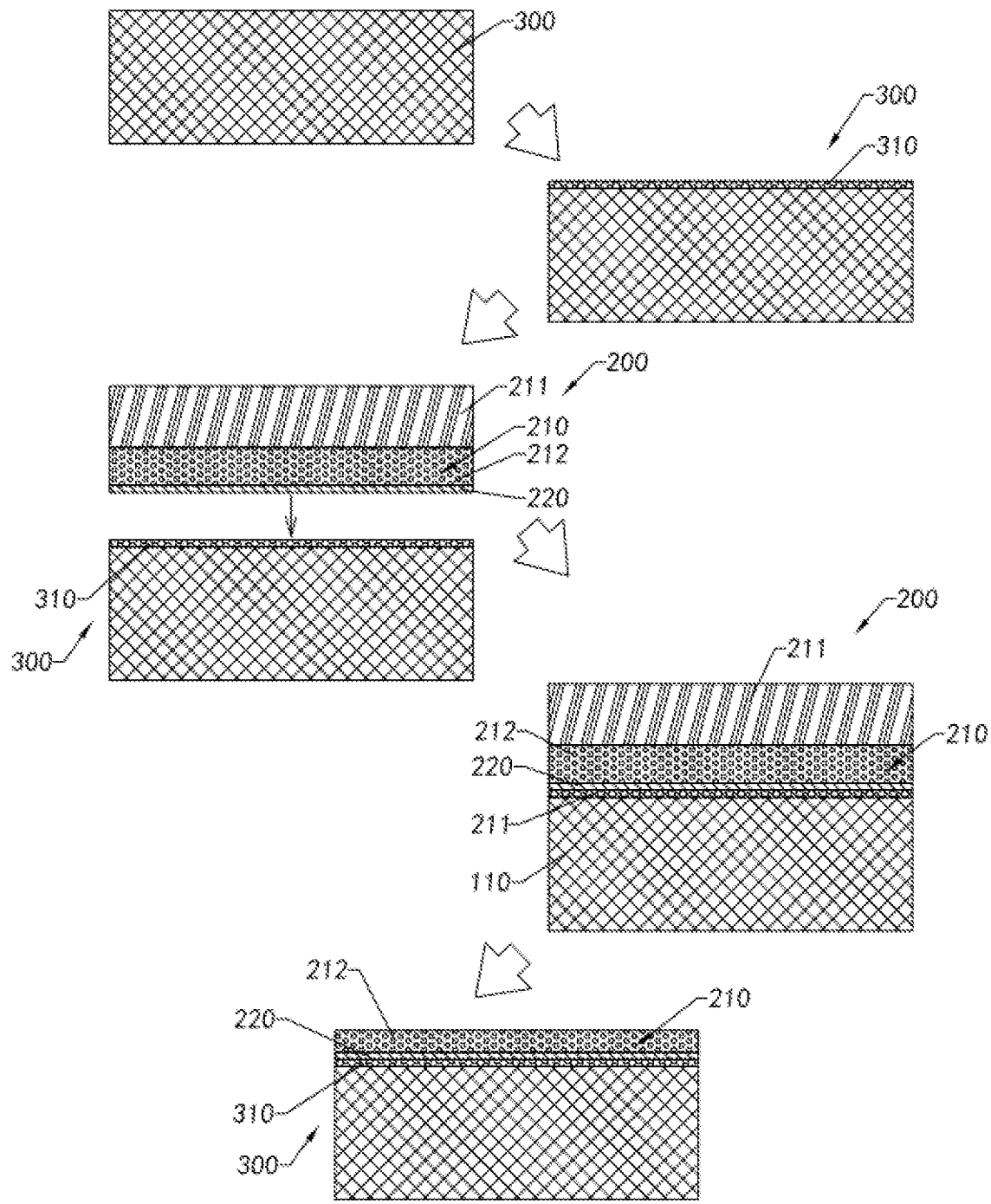
FIG. 6 shows a schematic diagram of Specific Example 2 of the optical device and the manufacturing method for an optical device according to an example of the present application.

FIG. 6 shows a schematic diagram of another specific example of the optical device and the manufacturing method for an optical device according to an example of the present application. As shown in FIG. 6, in this specific example, the purpose of the manufacturing method is to form a silicide layer 212 (e.g., a silicon dioxide layer or a nitride silicon layer) with a regular crystal orientation structure on the surface of the optical device, so as to provide protection for the optical device through the silicide layer 212, e.g., insulation, preventing scratches, preventing excessive exposure to the external environment, and the like.

As shown in FIG. 6, in this specific example, the manufacturing procedure of the optical device includes firstly performing preprocessing on the surface of the optical device to be transferred 300, so as to form a flat bonding surface on the surface of the optical device to be transferred 300 so as to bond to the transferring member 200.

Particularly, in this specific example, the process of preprocessing the surface of the optical device to be transferred 300 includes: forming a light-transmissive dielectric layer 310 on the surface of the optical device to be transferred 300, wherein the light-transmissive dielectric layer 310 is made of a light-transmissive material and has a relatively high light transmittance, so that it will not affect the light entering the optical device to be transferred 300. In this specific example, the material of the light-transmissive dielectric layer 310 is preferably silicide, for example, silicon dioxide, silicon nitride, and the like. In a particular implementation, the light-transmissive dielectric layer 310 can be formed on the surface of the optical device to be transferred 300 by, for example, a non-metallic vapor deposition process. Of course, in other implementations of this particular example, the light-transmissive dielectric layer 310 can also be formed by other processes. With respect to the process for forming the light-transmissive dielectric layer, it is not limited by the present application As shown in FIG. 6, preferably, in this specific example, the upper surface of the light-transmissive dielectric layer 310 is a flat surface, or in other words, a part of the upper surface of the light-transmissive dielectric layer 310 which is used to bond to the transferring member 200 has a relatively high flatness, thereby facilitating transfer of the transferring member 200 onto the optical device to be transferred 300.

It is worth mentioning that, in some cases of this specific example, the surface of the optical device to be transferred 300 may be uneven, and the upper surface of the light-transmissive dielectric layer 310 formed on the surface of the optical device to be transferred 300 by a deposition process may also be uneven. Therefore, in this particular implementation, the preprocessing also includes: polishing the surface of the optical device to be transferred 300, and/or polishing the upper surface of the light-transmissive dielectric layer 310. Herein, the polishing process may be a chemical mechanical polish process, or other processes that can increase the flatness of a surface.

As shown in FIG. 6, the manufacturing procedure of the optical device further includes: providing a transferring member 200. In particular, in this specific example, the transferring member 200 is a self-made semiconductor device (silicon on insolation), which from bottom to top sequentially includes: a silicon base layer 211, and a silicide layer 212 formed on the silicon base layer 211, wherein the silicide layer 212 is the target transferring layer 210 of the transferring member 200, i.e., in this specific example, the target transferring layer 210 of the transferring member 200 is located at the uppermost layer of the transferring member 200.

In particular, in an example of the present application, the crystal orientation arrangement of atoms in the silicide layer 212 (i.e., the target transferring layer 210) is regular. In a particular implementation of this specific example, the self-made transferring member 200 can be prepared in the following manner: firstly a monocrystalline silicon structure with a regular crystal orientation structure is formed by a process such as the Czochralski method or floating zone melting method, then a part of the monocrystalline silicon structure is processed to obtain the silicide layer 212, wherein the unprocessed part of the monocrystalline silicon structure forms the silicon base layer 211. For example, when the silicide layer 212 is a silicon dioxide layer, oxygen ions can be implanted into corresponding positions of the monocrystalline silicon structure to form the silicon dioxide layer. It should be understood that, since the atoms in the monocrystalline silicon structure have regular crystal orientation distribution, the silicide layer 212 has a regular crystal orientation structure, and the silicon base layer 211 also has a regular crystal orientation structure.

It is worth mentioning that, in this specific example, the surface of the silicon crystal layer 213 is a flat surface.

As shown in FIG. 6, the manufacturing procedure of the optical device further includes: coupling the transferring member 200 to the optical device to be transferred 300 in such a way that the upper surface of the transferring member 200 is bonded to the upper surface of the light-transmissive dielectric layer 310 of the optical device to be transferred 300. That is to say, the transferring member 200 is transferred to the optical device to be transferred 300 in such a way that the upper surface of the silicide layer 212 of the transferring member 200 is bonded to the upper surface of the light-transmissive dielectric layer 310 of the optical device to be transferred 300.

In order to ensure the bonding strength between the transferring member 200 and the optical device to be transferred 300, preferably, in an example of the present application, the upper surface of the transferring member 200 preferably has a good bonding reaction with the upper surface of the light-transmissive dielectric layer 310, so that the two can produce a good bonding reaction when bonding, thereby resulting in greater bonding force. For example, in this specific example, the upper surface of the transferring member 200 is made of the same material as the light-transmissive dielectric layer 310, so that the two can produce a good bonding reaction when bonding, thereby resulting in a larger bonding force.

In this example, the upper surface of the transferring member 200 is formed by the upper surface of the silicide layer 212, and the light-transmissive dielectric layer 310 is also formed of silicide. Therefore, when the silicide layer 212 of the transferring member 200 has the same type of silicide as that of the light-transmissive dielectric layer 310, the upper surface of the transferring member 200 and the upper surface of the light-transmissive dielectric layer 310 have a good bonding reaction, so that a greater bonding force is produced when the two are bonded.

As shown in FIG. 6, the manufacturing procedure of the optical device further includes: exposing the silicide layer 212. In this specific example, the silicon base layer 211 may be removed by one or a combination of mechanical grinding, chemical mechanical polishing, and etching, so that the silicide layer 212 is exposed. Correspondingly, in this specific example, the retained silicide layer 212 has a regular crystal orientation structure, which can provide better protection for the optical device, including but not limited to: insulation, preventing scratches, preventing excessive exposure to the external environment, and the like.

It is worth mentioning that, mechanical grinding has high efficiency but poor precision, while chemical mechanical polishing and etching processes have low efficiency but high precision. Therefore, in this specific example, it is preferable to use mechanical grinding to polish the silicon base layer 211 as the first-stage processing, and then perform the second-stage processing on the silicon base layer 211 by chemical mechanical polishing or etching process, so as to remove the silicon base layer 211.

In other solutions of this specific example, the manufacturing procedure of the optical device further includes: removing at least a part of the silicide layer 212, i.e., further processing the silicide layer 212 to make the silicide layer 212 thinner.

In summary, the optical device and a manufacturing method thereof based on this specific example are clarified, wherein a specific manufacturing method is used to transfer the silicide layer with a better crystal orientation arrangement to the surface of the optical device to be transferred 300, so that the surface of the finally manufactured optical device has an optical layer structure with better crystal orientation arrangement.

Specific Example 3

Figure 7:
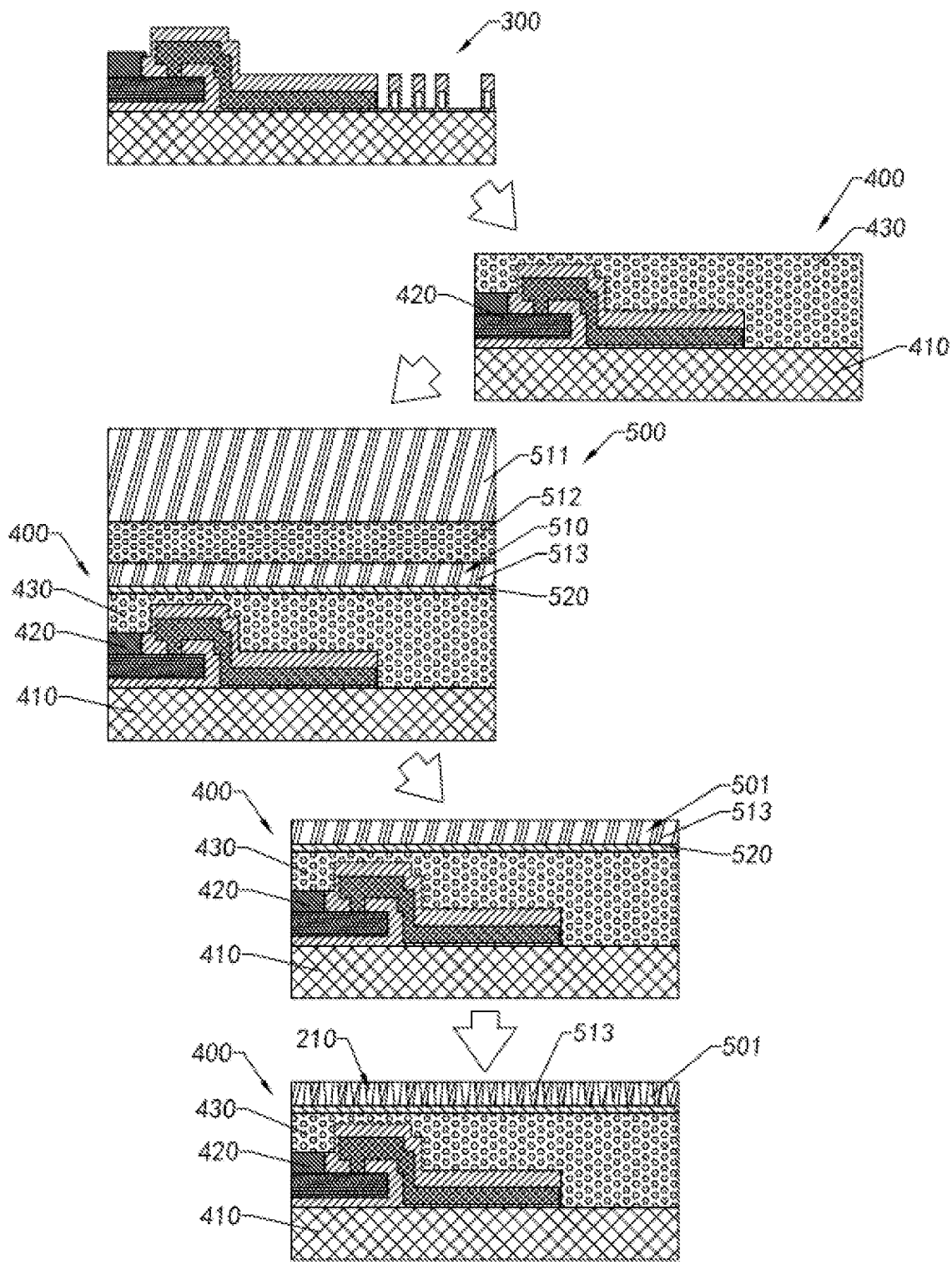
FIG. 7 shows a schematic diagram of Specific Example 3 of the optical device and the manufacturing method for an optical device according to an example of the present application.

FIG. 7 shows a schematic diagram of another specific example of the optical device and the manufacturing method for an optical device according to another example of the present application. As shown in FIG. 7, in this specific example, the optical device is a spectral chip, the optical device body 110 is a semi-finished spectral chip 400, and the purpose of the manufacturing method is to form a silicon crystal layer 513 with a regular crystal orientation structure on the surface of the semi-finished spectral chip 400, and the silicon crystal layer 513 has a light modulation structure 510 for modulating the imaging light entering the spectral chip, so as to extract and utilize spectral information in the imaging light.

Herein, the spectral chip involved in this application is applied to a computational spectrometer, wherein the most significant difference between a computational spectrometer and a traditional spectrometer lies in the difference in light filtering. In traditional spectrometers, the filters for wavelength selection are bandpass filters. The higher the spectral resolution is, a filter with narrower and more passband must be used, which increases the size and complexity of the whole system. At the same time, when the spectral response curve narrows, the luminous flux decreases, thereby resulting in a lower signal-to-noise ratio.

For computational spectrometers, a wide-spectrum filter is used for each filter, which makes the data detected by the computational spectrometer system look completely different from that of the original spectrum. However, by applying computational reconstruction algorithms, the original spectrum can be computationally restored. Since a broadband filter allows more light to pass through than a narrowband filter, a computational spectrometer can detect spectrum from darker scenes. In addition, according to the compressive sensing theory, the spectral curve of a filter can be properly designed to restore the sparse spectrum with high probability, and the number of filters is much smaller than the desired number of spectral channels (recovering higher-dimensional vectors from lower-dimensional vectors), which is undoubtedly very conducive to miniaturization. On the other hand, by using a larger number of filters, the noise may be reduced by using regularization algorithm (obtaining a denoised lower-dimensional vector from a higher-dimensional vector), which increases the signal-to-noise ratio and makes the overall system more robust.

Relatively speaking, when designing a traditional spectrometer, it is necessary to design a filter according to the desirable wavelength (the effect is equivalent to the light modulation structure of the spectral chip), so that the light of a specific wavelength can pass through (generally it is designed to enhance projection of incident light with a specific wavelength, while the incident light of a non-specific wavelength band cannot be projected. By changing the structural period and diameter of nanodisks and other structures, the resonance conditions can be controlled, thereby changing the central wavelength of the incident light that can enhance the projection so as to achieve the filtering characteristics). That is to say, in the design process of traditional spectrometers, it is necessary to focus on controlling the size and position accuracy of the light modulation structure, and at the same time, it is necessary to find ways to improve its transmittance at a specific wavelength. For computational spectrometers, it is necessary to receive light in a wider range of wavelengths (e.g., 350-900 nm). Therefore, it is necessary to focus more on the refractive index during the design.

Correspondingly, as mentioned above, in this example, the spectral chip is manufactured by the above manufacturing method, i.e., a silicon crystal layer with a regular crystal orientation structure is formed on the surface of the semi-finished spectral chip, and the silicon crystal layer has a light modulation structure and has a relatively large refractive index, so that light in a relatively large range of wavelength bands can be collected and utilized.

In this specific example, the semi-finished spectral chip 400 includes an image sensing layer 410 and a signal-processing circuit layer 420 connected to the image sensing layer 410. It is worth mentioning that, the semi-finished spectral chip 400 may also include other structures. More particularly, in this example, a semi-finished spectral chip without the silicon base layer 511 having the light modulation structure 501 can be referred to as a semi-finished spectral chip 400.

Moreover, in this specific example, the semi-finished spectral chip 400 may be provided by a manufacturer, or may be obtained by processing an existing photosensitive chip. Those of ordinary skill in the art should know that existing photosensitive chips, such as CCD photosensitive chips and CMOS photosensitive chips, include a microlens layer, a color filter layer (herein, if it is a black and white chip, the color filter layer is not comprised), image sensing layer 410, and signal-processing circuit layer 420. Correspondingly, the semi-finished spectral chip 400 can be obtained by removing the microlens layer and the color filter layer of the existing photosensitive chip (if it is a black and white chip, only the microlens layer needs to be removed); i.e., by applying the manufacturing method for an optical device according to an example of the present application, a spectral chip used in a computational spectrometer may be prepared by using the existing photosensitive chip, thereby reducing the application cost.

As shown in FIG. 7, in this specific example, the manufacturing procedure of the optical device includes: firstly performing preprocessing on the surface of the semi-finished spectral chip 400, so as to form a flat bonding surface for bonding to the transferring member 200 of the target transferring layer 510 on the surface of the semi-finished spectral chip 400.

Particularly, in this specific example, the process of preprocessing the surface of the semi-finished spectral chip 400 includes: forming a light-transmissive dielectric layer 430 on the surface of the semi-finished spectral chip 400, wherein the light-transmissive dielectric layer 430 is made of light-transmissive material, and has a relatively high light transmittance, so that it will not affect the light entering the semi-finished spectral chip 400.

It is worth mentioning that, in actual implementation, although the light-transmissive dielectric layer 430 requires a relatively high refractive index, the refractive index of the light-transmissive dielectric layer 430 should not be too high, the reason is that the difference in refractive index between the light-transmissive dielectric layer 430 and the semiconductor structure layer thereon should be guaranteed.

In this specific example, the material of the light-transmissive dielectric layer 430 is preferably silicide, for example, silicon dioxide, silicon nitride, and the like. Those skilled in the art should know that the refractive index of silicon dioxide is about 1.45, and that of silicon nitride is 1.9-2.3.

In a particular implementation, the light-transmissive dielectric layer 430 can be formed on the surface of the semi-finished spectral chip 400 by, for example, a non-metallic vapor deposition process. Of course, in other implementations of this particular example, the light-transmissive dielectric layer 430 can also be formed by other processes. With respect to the forming process, it is not limited by the present application. In particular, in this specific example, the thickness dimension of the light-transmissive dielectric layer 430 is not limited by the present application, and its specific value can be adjusted according to the specific requirements of the application scene; generally, the thickness dimension is less than or equal to 300 nm, in some special circumstances it is even less than 100 nm.

As shown in FIG. 5, preferably, in this specific example, the upper surface of the light-transmissive dielectric layer 430 is a flat surface, or in other words, the part of the upper surface of the light-transmissive dielectric layer 430 used for bonding to the transferring member 200 has a relatively high flatness, so as to facilitate transferring the transferring member 200 onto the semi-finished spectral chip 400.

It is worth mentioning that, in some cases of this specific example, the surface of the semi-finished spectral chip 400 may be uneven, and the upper surface of the light-transmissive dielectric layer 430 formed on the surface of the semi-finished spectral chip 400 through a deposition process may also be uneven. Therefore, in this particular implementation, the preprocessment process also includes: polishing the surface of the semi-finished spectral chip 400, and/or polishing the upper surface of the light-transmissive dielectric layer 430. Herein, the polishing process may be a chemical mechanical polish process, or other processes that can increase the flatness of a surface. With respect to this, it is not limited by the present application.

It is worth mentioning that, in this specific example, if the surface flatness of the semi-finished spectral chip 400 meets the preset requirements, the light-transmissive dielectric layer 430 may not be provided on the surface of the semi-finished spectral chip 400, i.e., there is no need to perform preprocessing on the semi-finished spectral chip 400.

Further, as shown in FIG. 7, the manufacturing procedure of the optical device further includes: providing a transferring member 500. In particular, in this specific example, the transferring member 500 is selected as an SOI device (silicon on insulation), which from bottom to top sequentially includes: a silicon base layer 511, a silicide layer 512 and a silicon crystal layer 513, wherein the silicon crystal layer 513 is the target transferring layer 510 of the transferring member 500; i.e., in this specific example, the target transferring layer 510 of the transferring member 500 is located at the uppermost layer of the transferring member 500. Those of ordinary skill in the art should know that the SOI device is an existing component, and a ready-made device including the target transferring layer 510 is used as the transferring member 500, so that the cost can be reduced on the one hand, and on the other hand, the technology development of the existing device has matured with stable and predictable performance.

Moreover, those of ordinary skill in the art should know that in the SOI device, the arrangement of atoms in the silicon base layer 511, the silicide layer 512, and the silicon crystal layer 513 is regular, i.e., all of the three have good crystal orientation structure. Preferably, in this specific example, the surface of the silicon crystal layer 513 is a flat surface.

As shown in FIG. 7, the manufacturing procedure of the optical device further includes: coupling the transferring member 500 to the semi-finished spectral chip 400 in such a way that the upper surface of the transferring member 500 is bonded to the upper surface of the light-transmissive dielectric layer 430 of the semi-finished spectral chip 400; i.e., transferring the SOI device to the semi-finished spectral chip 400 in such a way that the upper surface of the silicon crystal layer 513 of the SOI device is bonded to the upper surface of the light-transmissive dielectric layer 430 of the semi-finished spectral chip 400.

In order to ensure the bonding strength between the transferring member 500 and the semi-finished spectral chip 400, preferably, in an example of the present application, the upper surface of the transferring member 500 is preferably has a good bonding reaction with the light-transmissive dielectric layer 430, so that the two surfaces can produce a good bonding reaction when bonding, thereby resulting in greater bonding force. For example, in this specific example, the upper surface of the transferring member 500 is configured to be made of the same material as the light-transmissive dielectric layer 430, so that the two can produce a good bonding reaction when bonding, thereby resulting in a larger bonding force.

Taking the light-transmissive dielectric layer 430 to be made of silicon dioxide as an example, it should be understood that in this specific example, the upper surface of the transferring member 500 is formed by the surface of the silicon crystal layer 513. Therefore, in this particular implementation, before bonding the upper surface of the transferring member 500 to the upper surface of the light-transmissive dielectric layer 430, it further includes: processing the upper surface of the transferring member 500 so that the upper surface of the transferring member 500 is made of silicon dioxide material.

In a particular implementation, oxygen ions may be implanted into the surface of the silicon crystal layer 513 to form a silicon dioxide layer on the surface of the silicon crystal layer 513, so that the upper surface of the transferring member 500 is formed by silicon dioxide. It should be understood that, the silicon crystal layer 513 has a regular crystal orientation structure; therefore, the silicon dioxide layer also has a regular crystal orientation structure so as to improve its bonding effect with the light-transmissive dielectric layer 430.

Of course, in other implementations of this specific example, a bonding layer 520 can also be stacked on the surface of the silicon crystal layer 513, wherein the bonding layer 520 is made of silicon dioxide material. For example, the bonding layer 520 is formed on the surface of the silicon crystal layer 513 by superimposition through a non-metallic vapor deposition process, so as to improve the bonding strength between the transferring member 500 and the semi-finished spectral chip 400 through the bonding layer 520.

It is worth mentioning that, in this specific example, the process of processing the upper surface of the transferring member 500 can also be completed in the step of providing the transferring member 500. With respect to this, it is not limited by the present application.

As shown in FIG. 7, the manufacturing procedure of the optical device further includes: exposing the target transferring layer 510 of the transferring member 500, i.e., exposing the silicon crystal layer 513 of the transferring member 500. In this specific example, the silicon base layer 511 and the silicide layer 512 may be removed by one or a combination of mechanical grinding, chemical mechanical polishing, and etching processes, so that the silicon crystal layer 513 of the transferring member 500 is exposed.

It is worth mentioning that, mechanical grinding has high efficiency but poor precision, while chemical mechanical polishing and etching processes have low efficiency but high precision. Therefore, in this specific example, it is preferable to use mechanical grinding to polish the silicon base layer 511 and the silicide layer 512 as the first-stage processing, and then perform the second-stage processing on the silicon base layer 511 and the silicide layer 512 by a chemical mechanical polishing or etching process, so as to take into account both efficiency and precision.

In particular, in an example of the present application, the refractive index of the silicon crystal layer 513 is about 3.42, and the difference in refractive index between the silicon crystal layer 513 and the light-transmissive dielectric layer 430 is greater than or equal to 0.5, preferably greater than or equal to 0.7.

In particular, in this specific example, the spectral chip has certain requirements on the thickness of the silicon crystal layer 513, and the thickness range of the silicon crystal layer 513 is 5-1000 nm, preferably 50-750 nm; such a thickness is beneficial to the processing of the silicon base layer 511, so that the imaging effect of the spectral chip can be optimized and ensured. More preferably, the thickness range of the silicon crystal layer 513 is 150-250 nm.

Correspondingly, in this specific example, in order to meet the thickness requirement, the process of removing the silicon base layer 511 and the silicide layer 512 further includes: removing a part of the silicon crystal layer 513, so that the thickness dimension of the silicon crystal layer 513 meets the preset requirements.

As shown in FIG. 7, the manufacturing procedure of the optical device further includes: forming a light modulation structure 501 on the exposed and retained silicon crystal layer 513, so that the silicon crystal layer 513 has the light modulation structure 501. In this way, when the external imaging light enters the inside of the spectral chip through the silicon crystal layer 513, the silicon crystal layer 513 having the light modulation structure 501 can modulate the imaging light so as to extract and utilize spectral information of the imaging light. Those skilled in the art should know that, the light modulation structure 501 is actually a specific pattern formed in the silicon crystal layer 513, so as to perform specific modulation processing on the imaging light through the specific pattern.

Particularly, in this specific example, the refractive index of the light modulation structure 501 is 1-5, and the difference between the refractive index of the light modulation structure 501 and that of the light-transmissive dielectric layer 430 greater than or equal to 0.5, preferably greater than or equal to 0.7. In this way, light with a relatively large range of wavelengths can penetrate the light-transmissive dielectric layer 430 and the image sensing layer 410 of the spectral chip after passing through the light modulation structure 501.

In the particular implementation of this specific example, the light modulation structure 501 may be formed on the silicon crystal layer 513 by etching, nanoimprinting and other processes. Particularly, the specific technological process of nanoscreen printing process is as follows: firstly, coating photosensitive material (e.g., photoresist) on the surface of metal film on the wafer; then pressing the template engraved with filter pattern on it, especially the template is transparent; next, irradiating ultraviolet light (UV light) thereto, so as to harden the photoresist on which the template pattern has been printed. The template is then peeled off to reveal the patterned photoresist. Correspondingly, after the light modulation structure 501 is formed, the manufacture of the spectral chip is completed.

It should be understood that, in this specific example, the atoms in the silicon crystal layer 513 of the transferring member 500 have a regular crystal orientation distribution, and when it is transferred to the surface of the semi-finished spectral chip 400 through the above-mentioned manufacturing method, the internal structure of the silicon crystal layer 513 has not changed. Therefore, the spectral chip manufactured according to the manufacturing method disclosed in this specific example has an optical layer structure formed on its surface with a better crystal orientation arrangement.

In summary, based on this specific example, the spectral chip and the manufacturing method thereof are clarified, which uses a specific manufacturing method to transfer the silicon crystal layer 513 with a better crystal orientation arrangement to the surface of the semi-finished spectral chip 400, so that the surface of the finally manufactured spectral chip has an optical layer structure with better crystal orientation arrangement.

Figure 8:
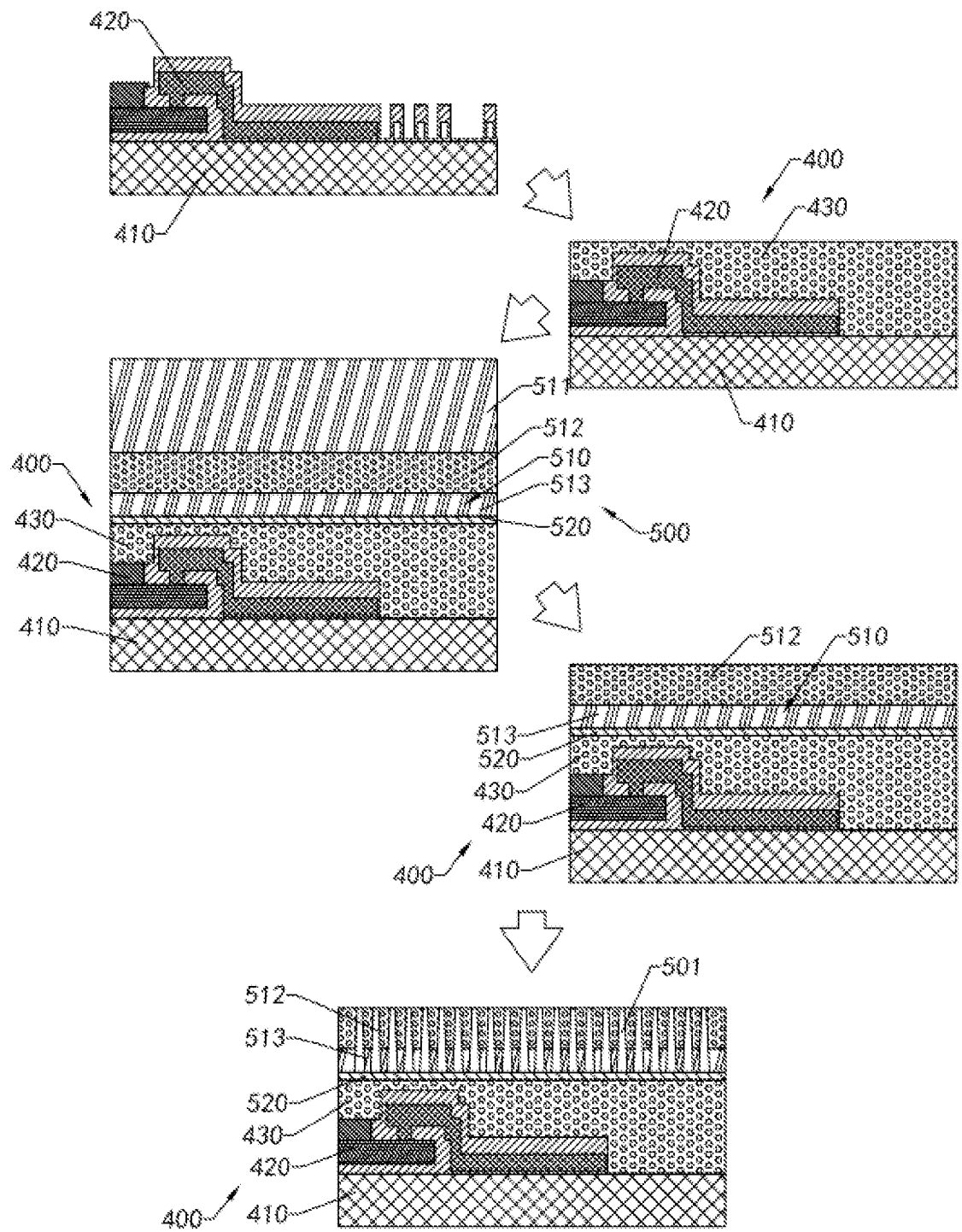
FIG. 8 shows a schematic diagram of a modified implementation of the optical device and the manufacturing method for an optical device illustrated according to Specific Example 3.

FIG. 8 shows a schematic diagram of a modified implementation according to the specific example illustrated in FIG. 7. As shown in FIG. 8, in this modified implementation, a part of the silicide layer 512 in the transferring member 500 is retained, i.e., in this modified implementation, only at least a part of the silicon base layer 511 and the silicide layer 512 are removed, so that a part of the silicide layer 512 and the silicon crystal layer 513 are remained. Herein, the retained silicide layer 512 can provide certain protection for the silicon crystal layer 513. Correspondingly, during the subsequent process of forming the light modulation structure 501, the retained silicide layer 512 is also partially etched, as shown in FIG. 8.

In particular, in this modified implementation, the silicide layer 512 has a regular crystal orientation structure, which does not affect the transmittance, and at the same time, the silicide layer 512 can also protect the light modulation structure 501. It is worth mentioning that, the maximum distance between the upper surface of the silicide layer 512 and the upper surface of the light-transmissive dielectric layer 430 is no more than 1100 nm, preferably no more than 700 nm.

Figure 9:
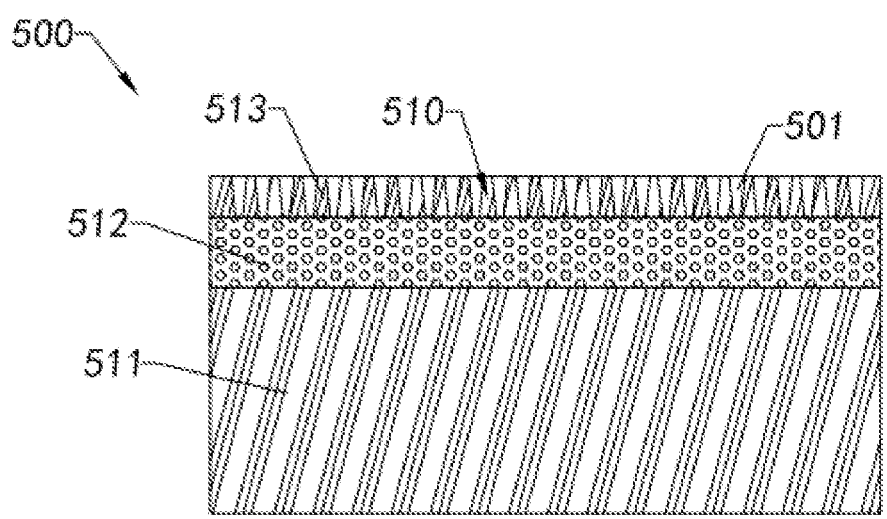
FIG. 9 shows a schematic diagram of another modified implementation of the optical device and the manufacturing method for an optical device illustrated according to Specific Example 3.

FIG. 9 shows a schematic diagram of another modified implementation according to the specific example illustrated in FIG. 7. As shown in FIG. 9, in the manufacturing method disclosed in this modified example, before transferring the transferring member 500 to the semi-finished spectral chip 400 through bonding process, the silicon crystal layer 513 of the transferring member 500 is pre-processed to form the light modulation structure 501 in the silicon crystal layer 513, wherein the thickness of the silicon crystal layer 513 is 200-1000 nm, preferably 350-600 nm. Correspondingly, when the silicon crystal layer 513 is subsequently exposed, the light modulation structure 501 of the silicon crystal layer 513 is also exposed synchronously.

That is to say, compared with the manufacturing method shown in FIG. 7, in this modified example, the light modulation structure 501 is firstly prefabricated on the transferring member 500, or in other words, the process of forming the light modulation structure 501 is adjusted forward.

Specific Example 4

Figure 10:
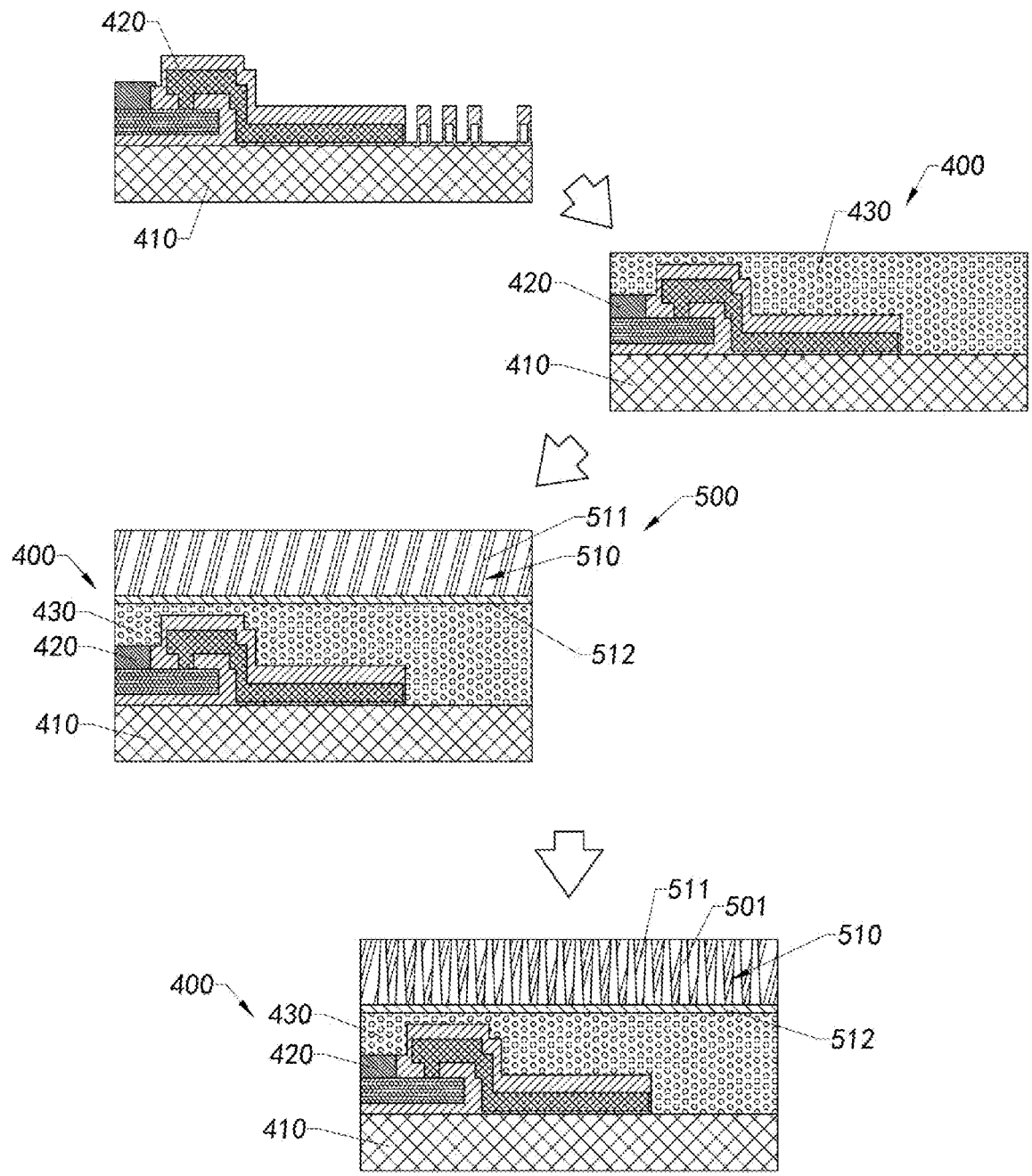
FIG. 10 shows a schematic diagram of Specific Example 4 of the optical device and the manufacturing method for an optical device according to an example of the present application.

FIG. 10 shows a schematic diagram of another specific example of the optical device and the manufacturing method for an optical device according to still another example of the present application. As shown in FIG. 10, in this specific example, the optical device is a spectral chip, the optical device body 110 is a semi-finished spectral chip 400, and the purpose of the manufacturing method is to form a silicon crystal layer 511 with a regular crystal orientation structure on the surface of the semi-finished spectral chip 400, and the silicon crystal layer 511 has a light modulation structure 501 for modulating the imaging light entering the spectral chip, so as to extract and utilize spectral information in the imaging light.

Herein, the spectral chip involved in this application is applied to a computational spectrometer, wherein the most significant difference between a computational spectrometer and a traditional spectrometer lies in the difference in light filtering. In traditional spectrometers, the filters for wavelength selection are bandpass filters. The higher the spectral resolution is, a filter with narrower and more passband must be used, which increases the size and complexity of the whole system. At the same time, when the spectral response curve narrows, the luminous flux decreases, thereby resulting in a lower signal-to-noise ratio.

For computational spectrometers, a wide-spectrum filter is used for each filter, which makes the data detected by the computational spectrometer system look completely different from that of the original spectrum. However, by applying computational reconstruction algorithms, the original spectrum can be computationally restored. Since a broadband filter allows more light to pass through than a narrowband filter, a computational spectrometer can detect spectrum from darker scenes. In addition, according to the compressive sensing theory, the spectral curve of a filter can be properly designed to restore the sparse spectrum with high probability, and the number of filters is much smaller than the desired number of spectral channels (recovering higher-dimensional vectors from lower-dimensional vectors), which is undoubtedly very conducive to miniaturization. On the other hand, by using a larger number of filters, the noise may be reduced by using regularization algorithm (obtaining a denoised lower-dimensional vector from a higher-dimensional vector), which increases the signal-to-noise ratio and makes the overall system more robust.

Relatively speaking, when designing a traditional spectrometer, it is necessary to design a filter according to the desirable wavelength (the effect is equivalent to the light modulation structure of the spectral chip), so that the light of a specific wavelength can pass through (generally it is designed to enhance projection of incident light with a specific wavelength, while the incident light of a non-specific wavelength band cannot be projected. By changing the structural period and diameter of nanodisks and other structures, the resonance conditions can be controlled, thereby changing the central wavelength of the incident light that can enhance the projection so as to achieve the filtering characteristics). That is to say, in the design process of traditional spectrometers, it is necessary to focus on controlling the size and position accuracy of the light modulation structure, and at the same time, it is necessary to find ways to improve its transmittance at a specific wavelength. For computational spectrometers, it is necessary to receive light in a wider range of wavelengths (e.g., 350-900 nm). Therefore, it is necessary to focus more on the refractive index during the design.

Correspondingly, as mentioned above, in this example, the spectral chip is manufactured by the above manufacturing method, i.e., a silicon crystal layer 511 with a regular crystal orientation structure is formed on the surface of the semi-finished spectral chip 400, and the silicon crystal layer 511 has a light modulation structure 501 and has a relatively large refractive index, so that light in a relatively large range of wavelength bands can be collected and utilized.

In this specific example, the semi-finished spectral chip 400 includes an image sensing layer 410 and a signal-processing circuit layer 420 connected to the image sensing layer 410. It is worth mentioning that, the semi-finished spectral chip 400 may also include other structures. More particularly, in this example, a semi-finished spectral chip without the silicon crystal layer 511 having the light modulation structure 501 can be referred to as a semi-finished spectral chip 400.

Moreover, in this specific example, the semi-finished spectral chip 400 may be provided by a manufacturer, or may be obtained by processing an existing photosensitive chip. Those of ordinary skill in the art should know that existing photosensitive chips, such as CCD photosensitive chips and CMOS photosensitive chips, include a microlens layer, a color filter layer (herein, if it is a black and white chip, the color filter layer is not included), image sensing layer 410, and signal-processing circuit layer 420. Correspondingly, the semi-finished spectral chip 400 can be obtained by removing the microlens layer and the color filter layer of the existing photosensitive chip (if it is a black and white chip, only the microlens layer needs to be removed); for example, the photosensitive chip may be bombarded with cations to remove the microlens layer and the color filter layer; alternatively, the photosensitive chip may also be put into a dissolving agent for dissolution. That is to say, by applying the manufacturing method for an optical device according to an example of the present application, a spectral chip used in a computational spectrometer may be prepared by using the existing photosensitive chip, thereby reducing the application cost.

As shown in FIG. 10, in this specific example, the manufacturing procedure of the optical device includes: firstly performing preprocessing on the surface of the semi-finished spectral chip 400, so as to form a flat bonding surface for bonding to the transferring member 500 of the target transferring layer 510 on the surface of the semi-finished spectral chip 400.

Particularly, in this specific example, the process of preprocessing the surface of the semi-finished spectral chip 400 includes: forming a light-transmissive dielectric layer 430 on the surface of the semi-finished spectral chip 400, wherein the light-transmissive dielectric layer 430 is made of light-transmissive material, and has a relatively high light transmittance, so that it will not affect the light entering the semi-finished spectral chip 400.

It is worth mentioning that, in actual implementation, although the light-transmissive dielectric layer 430 requires a relatively high refractive index, the refractive index of the light-transmissive dielectric layer 430 should not be too high, the reason is that the difference in refractive index between the light-transmissive dielectric layer 430 and the semiconductor structure layer thereon should be guaranteed.

In this specific example, the material of the light-transmissive dielectric layer 430 is preferably silicide, for example, silicon dioxide, silicon nitride, and the like. Those skilled in the art should know that the refractive index of silicon dioxide is about 1.45, and that of silicon nitride is 1.9-2.3.

In a particular implementation, the light-transmissive dielectric layer 430 can be formed on the surface of the semi-finished spectral chip 400 by, for example, a non-metallic vapor deposition process. Of course, in other implementations of this particular example, the light-transmissive dielectric layer 430 can also be formed by other processes. With respect to the forming process, it is not limited by the present application. In particular, in this specific example, the thickness dimension of the light-transmissive dielectric layer 430 is not limited by the present application, and its specific value can be adjusted according to the specific requirements of the application scene; generally, the thickness dimension is less than or equal to 300 nm, in some special circumstances it is even less than 100 nm.

As shown in FIG. 10, preferably, in this specific example, the upper surface of the light-transmissive dielectric layer 430 is a flat surface, or in other words, the part of the upper surface of the light-transmissive dielectric layer 430 used for bonding to the transferring member 500 has a relatively high flatness, so as to facilitate migrating the transferring member 500 onto the semi-finished spectral chip 400.

It is worth mentioning that, in some cases of this specific example, the surface of the semi-finished spectral chip 400 may be uneven, and the upper surface of the light-transmissive dielectric layer 430 formed on the surface of the semi-finished spectral chip 400 through a deposition process may also be uneven. Therefore, in this particular implementation, the preprocessing process also includes: polishing the surface of the semi-finished spectral chip 400, and/or polishing the upper surface of the light-transmissive dielectric layer 430. Herein, the polishing process may be a chemical mechanical polish process, or other processes that can increase the flatness of a surface, such as ALD process, chemical cleaning, etc. With respect to this, it is not limited by the present application.

It is worth mentioning that, in this specific example, if the surface flatness of the semi-finished spectral chip 400 meets the preset requirements, the light-transmissive dielectric layer 430 may not be provided on the surface of the semi-finished spectral chip 400, i.e., there is no need to perform preprocessing on the semi-finished spectral chip 400.

Further, as shown in FIG. 10, the manufacturing procedure of the optical device further includes: providing a transferring member 500. In particular, in this specific example, the transferring member 500 is a self-made semi-conductor device, which sequentially includes: a silicon crystal layer 511 and a silicide layer 512 formed under the silicon base layer 511, wherein the silicon crystal layer 511 is the target transferring layer 510 of the transferring member 500, i.e., in this specific example, the target transferring layer 510 of the transferring member 500 is located on the upper layer of the transferring member 500.

In particular, in an example of the present application, the crystal orientation arrangement of atoms in the silicon crystal layer 511 (i.e., the target transferring layer 510) is regular. Moreover, particularly, in this specific example, the refractive index of the silicon crystal layer 511 is about 3.42, and the difference in refractive index between the silicon crystal layer 511 and the light-transmissive dielectric layer 430 is greater than or equal to 0.5; preferably, it is greater than or equal to 0.7.

In a particular implementation of this specific example, the self-made transferring member 500 can be manufactured in the following manner: firstly, a monocrystalline silicon structure with a regular crystal orientation structure is formed by a process such as the Czochralski method or floating zone melting method; then processing a part of the monocrystalline silicon structure to obtain the silicide layer 512, wherein the unprocessed part of the monocrystalline silicon structure forms the silicon crystal layer 511; for example, when the silicide layer 512 is a silicon dioxide layer, oxygen ions may be implanted into corresponding position of the monocrystalline silicon structure to form the silicon dioxide layer. It should be understood that, since the atoms in the monocrystalline silicon structure have a regular crystal orientation distribution, the silicon crystal layer 511 also has a regular crystal orientation structure. Preferably, in this specific example, the surface of the silicon crystal layer 511 is a flat surface.

In addition, those skilled in the art can understand that the transferring member 500 can also be a semiconductor device directly obtained by purchasing or customizing, so that the semiconductor device can be directly bonded to the upper surface of the light-transmissive dielectric layer 430, and no further processing is required.

That is to say, the difference of Specific Example 4 over Specific Example 3 lies in that: the transferring member 500 may only include a silicon crystal layer 511 and a silicide layer 512, wherein the silicon crystal layer 511 serves as the target transferring layer 510 of the transferring member 500, while the silicide layer 512 serves as a bonding layer to help the silicon base layer 511 bond with the upper surface of the light-transmissive dielectric layer 430. In this way, the silicide layer 512 can play a role similar to that of the bonding layer 520 in the Specific Example 3, or it can be said to be equivalent to the bonding layer 520 in the Specific Example 3, thereby improving the bonding strength between the silicon crystal layer 511 and the semi-finished spectral chip 400. Herein, since the silicide layer 512 is located between the silicon crystal layer 511 and the semi-finished spectral chip 400, its thickness is less than 600 nm, preferably 300-400 nm; and it can also be less than 200 nm, so as not to affect the optical performance.

As shown in FIG. 10, the manufacturing procedure of the optical device further includes: coupling the transferring member 500 to the semi-finished spectral chip 400 in such a way that the lower surface of the transferring member 500 is bonded to the upper surface of the light-transmissive dielectric layer 430 of the semi-finished spectral chip 400, so as to form a spectral chip with optical modulation decoupling. That is to say, the transferring member 500 is transferred to the semi-finished spectral chip 400 in such a way that the upper surface of the silicide layer 512 of the transferring member 500 is bonded to the upper surface of the light-transmissive dielectric layer 430 of the semi-finished spectral chip 400. Moreover, since the transferring member 500 in the specific example only includes the silicon crystal layer 511 and the silicide layer 512, a spectral chip with optical modulation decoupling can be directly formed.

In order to ensure the bonding strength between the transferring member 500 and the semi-finished spectral chip 400, in an example of the present application, the lower surface of the transferring member 500 is the silicide layer 512 which has a good bonding reaction with the light-transmissive dielectric layer 430, so that the two surfaces can produce a good bonding reaction when bonding, thereby resulting in greater bonding force. For example, in this specific example, the silicide layer 512 is configured to be made of the same material as the light-transmissive dielectric layer 430, so that the two can produce a good bonding reaction when bonding, thereby resulting in a larger bonding force.

Taking the light-transmissive dielectric layer 430 to be made of silicon dioxide as an example, it should be understood that in this specific example, the lower surface of the transferring member 500 is formed by the surface of the silicide layer 512. Therefore, in this particular implementation, the silicide layer 512 may be made of silicon dioxide material. Moreover, it should be understood that, the silicon crystal layer 511 has a regular crystal orientation structure; therefore, the silicide layer 512 of silicon dioxide material also has a regular crystal orientation structure so as to improve its bonding effect with the light-transmissive dielectric layer 430.

In addition, those skilled in the art can understand that, in this specific example, in addition to the silicon crystal layer 511 and the silicide layer 512 described above, the transferring member 500 may also include other layer as in other specific examples; for example, another silicide layer and/or a silicon base layer on the other side of the silicon crystal layer 511 opposite to the silicide layer 512.

Therefore, the manufacturing procedure of the optical device optionally further includes: removing other layer to retain the target transferring layer 510 of the transferring member 500, i.e., retaining the silicon crystal layer 511 of the transferring member 500. In this specific example, one or a combination of mechanical grinding, chemical mechanical polishing, and etching processes may be used to remove other layer, so that the silicon crystal layer 511 of the transferring member 500 is retained.

It is worth mentioning that, mechanical grinding has high efficiency but poor precision, while chemical mechanical polishing and etching processes have low efficiency but high precision. Therefore, in this specific example, it is preferable to use mechanical grinding to polish other layer as the first-stage processing, and then perform the second-stage processing on other layer by a chemical mechanical polishing or etching process, so as to take into account both efficiency and precision.

In particular, in this specific example, the spectral chip has certain requirements on the thickness of the silicon crystal layer 511, and the thickness range of the silicon crystal layer 511 is 5-1000 nm, preferably 50-750 nm; such a thickness is beneficial to the processing of the silicon crystal layer 511, so that the imaging effect of the spectral chip can be optimized and ensured. More preferably, the thickness range of the silicon crystal layer 511 is 150-250 nm.

Correspondingly, in this specific example, in order to meet the thickness requirement, the process of removing other layer further includes: removing a part of the silicon crystal layer 511, so that the thickness dimension of the silicon crystal layer 511 meets the preset requirements.

As shown in FIG. 10, the manufacturing procedure of the optical device further includes: forming a light modulation structure 501 on the retained silicon crystal layer 511, so that the silicon crystal layer 511 has the light modulation structure 501. In this way, when the external imaging light enters the inside of the spectral chip through the silicon crystal layer 511, the silicon crystal layer 511 having the light modulation structure 501 can modulate the imaging light so as to extract and utilize spectral information of the imaging light. Those skilled in the art should know that, the light modulation structure 501 is actually a specific pattern formed in the silicon crystal layer 511, so as to perform specific modulation processing on the imaging light through the specific pattern.

Particularly, in this specific example, the refractive index of the light modulation structure 501 is 1-5, and the difference between the refractive index of the light modulation structure 501 and that of the light-transmissive dielectric layer 430 greater than or equal to 0.5, preferably greater than or equal to 0.7. In this way, light with a relatively large range of wavelengths can penetrate the light-transmissive dielectric layer 430 and the image sensing layer 410 of the spectral chip after passing through the light modulation structure 501.

In the particular implementation of this specific example, the light modulation structure 501 may be formed on the silicon crystal layer 511 by etching, nanoimprinting and other processes. Correspondingly, after the light modulation structure 501 is formed, the manufacture of the spectral chip is completed. Particularly, the specific technological process of nanoscreen printing process is as follows: firstly, coating photosensitive material (e.g., photoresist) on the surface of metal film on the wafer; then pressing the template engraved with filter pattern on it, especially the template is transparent; next, irradiating ultraviolet light (UV light) thereto, so as to harden the photoresist on which the template pattern has been printed. The template is then peeled off to reveal the patterned photoresist.

It should be understood that, in this specific example, the atoms in the silicon crystal layer 511 of the transferring member 500 have a regular crystal orientation distribution, and when it is transferred to the surface of the semi-finished spectral chip 400 through the above-mentioned manufacturing method, the internal structure of the silicon crystal layer 511 has not changed. Therefore, the spectral chip prepared according to the manufacturing method disclosed in this specific example has an optical layer structure formed on its surface with a better crystal orientation arrangement.

In summary, based on this specific example, the spectral chip and the manufacturing method thereof are clarified, which uses a specific manufacturing method to transfer the silicon crystal layer 511 with a better crystal orientation arrangement to the surface of the semi-finished spectral chip 400, so that the surface of the final manufactured spectral chip has an optical layer structure with better crystal orientation arrangement.

Figure 11:
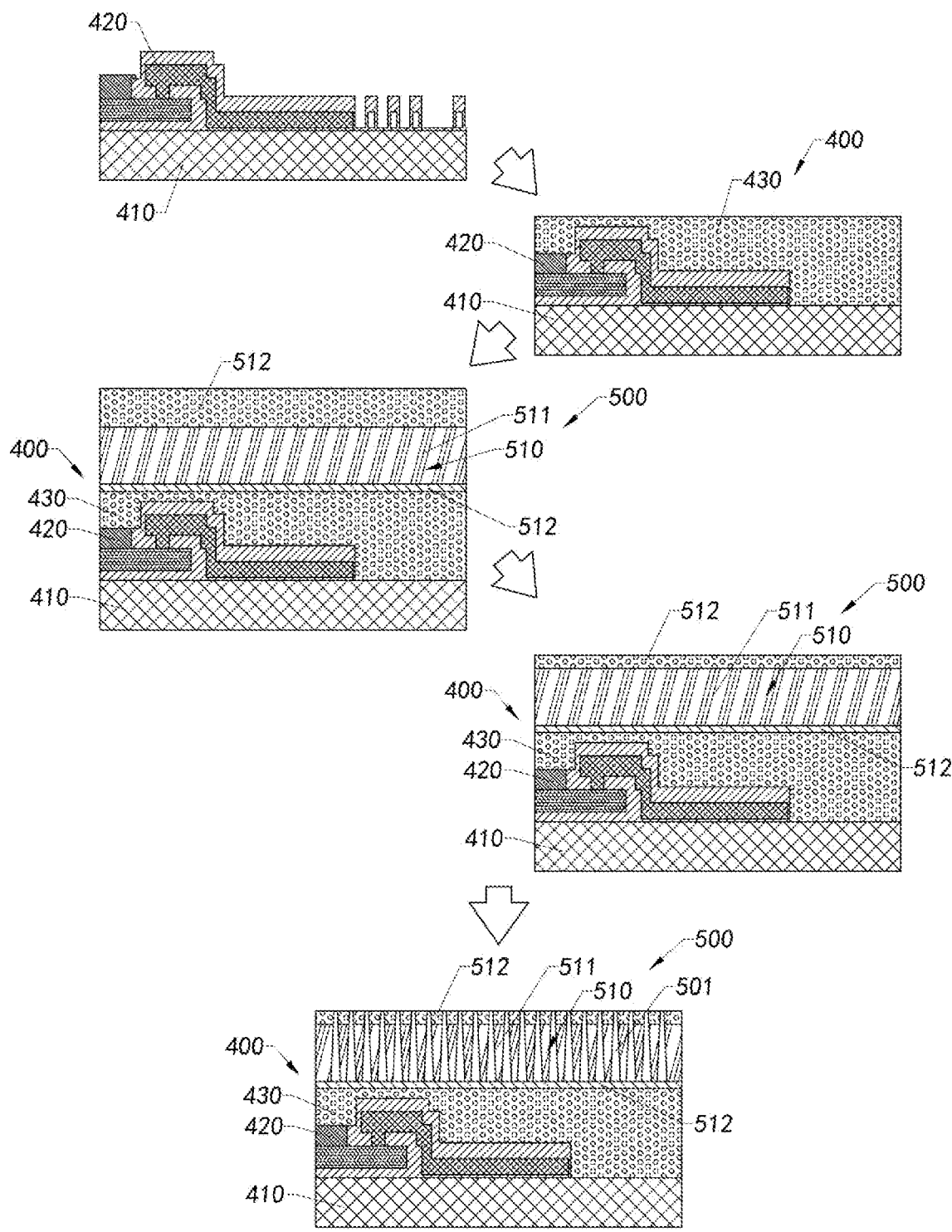
FIG. 11 shows a schematic diagram of another modified implementation of the optical device and the manufacturing method for an optical device illustrated according to Specific Example 4.

It is worth mentioning that, in some modified implementations of this specific example, if the transferring member 500 further includes other layer on the other side of the silicon crystal layer 511 opposite to the silicide layer 512, such as another silicide layer and/or the silicon base layer, then a part of the other layer may also be retained, i.e., in this modified implementation, only at least a part of the other layer is removed, so that a part of the other layer and the silicon crystal layer 511 are retained, for example, another silicide layer 512 as shown in FIG. 11. Herein, the retained part of other layer can provide certain protection for the silicon crystal layer 511. Correspondingly, in the subsequent process of forming the light modulation structure 501, the retained part of other layer, such as another silicide layer 512 as shown in FIG. 11 was also partially etched, and the final forming effect was shown in FIG. 11. In particular, in this modified implementation, the part of other layer also has a regular crystal orientation structure, which does not affect the transmittance, and at the same time, the part of other layer can also protect the light modulation structure 501. It is worth mentioning that, the maximum distance between the upper surface of the part of other layer and the upper surface of the light-transmissive dielectric layer 430 is no more than 1100 nm, preferably no more than 700 nm.

It is also worth mentioning that, in some other modified implementations according to the specific example, before transferring the transferring member 500 to the semi-finished spectral chip 400 through bonding process, the silicon crystal layer 511 of the transferring member 500 is pre-processed to form the light modulation structure 501 in the silicon crystal layer 511, and the effect is shown in FIG. 11, wherein the thickness of the silicon crystal layer is 200-1000 nm, preferably 350-600 nm. Correspondingly, when the silicon crystal layer 511 is subsequently retained, the light modulation structure 501 of the silicon crystal layer 511 is also retained synchronously. That is to say, in this modified example, the light modulation structure 501 is firstly pre-fabricated on the transferring member 500, or in other words, the process of forming the light modulation structure 501 is adjusted forward.

There is a modified implementation, which is different from this specific example and its modified implementations in that: the target transferring layer 510 of the transferring member 500 is a silicide layer 512, and its specific process is close to that of this specific example.

Those skilled in the art can understand that in yet another modified implementation, the lower surface of the silicon crystal layer 511 may also be bonded to the light-transmissive dielectric layer 430, and then the silicide layer 512 and a part of the silicon crystal layer 511 is removed, alternatively a part of the silicide layer 512 is removed; the specific process is similar to that of the Specific Example 3, except that the transferring member 500 is different.

In addition, there is also a modified implementation, wherein the transferring member 500 only includes a silicide layer, i.e., the target transferring layer 510 of the transferring member 500 is the silicide layer 512, and this silicide layer 512 also forms a light modulation structure, for example, it is fabricated after being transferred to the light-transmissive dielectric layer 430, or prefabricated before being transferred to the light-transmissive dielectric layer 430; the specific process is similar to that of this specific example and will not be elaborated herein.

Specific Example 5

Figure 12:
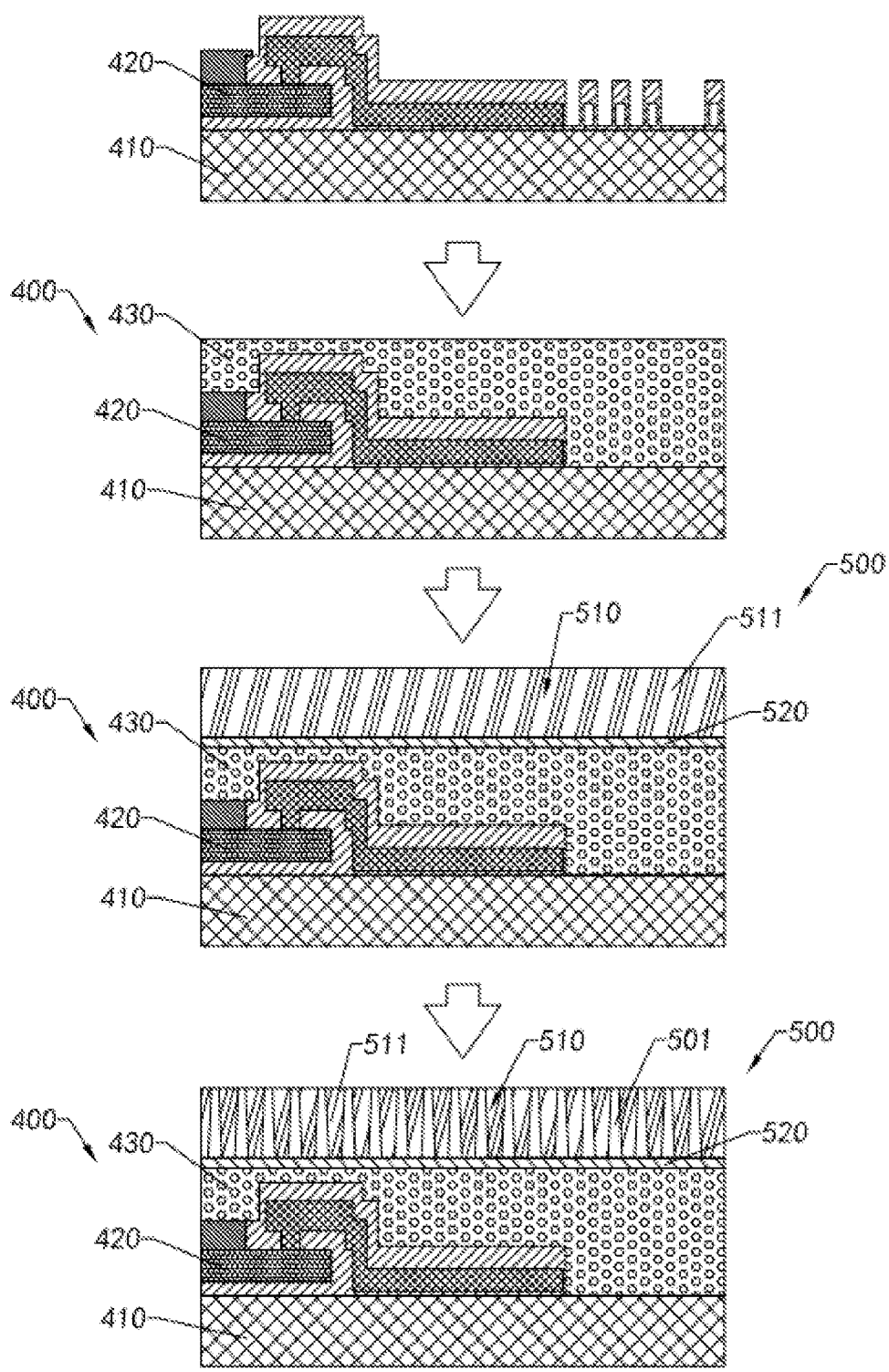
FIG. 12 shows a schematic diagram of Specific Example 5 of the optical device and the manufacturing method for an optical device according to an example of the present application.

FIG. 12 shows a schematic diagram of another specific example of the optical device and the manufacturing method for an optical device according to still another example of the present application. As shown in FIG. 12, in this specific example, the optical device is a spectral chip, the optical device body 110 is a semi-finished spectral chip 400, and the purpose of the manufacturing method is to form a silicon base layer 511 with a regular crystal orientation structure on the surface of the semi-finished spectral chip 400, and the silicon base layer 511 has a light modulation structure 501 for modulating the imaging light entering the spectral chip, so as to extract and utilize spectral information in the imaging light.

Herein, the spectral chip involved in this application is applied to a computational spectrometer, wherein the most significant difference between a computational spectrometer and a traditional spectrometer lies in the difference in light filtering. In traditional spectrometers, the filters for wavelength selection are bandpass filters. The higher the spectral resolution is, a filter with narrower and more passband must be used, which increases the size and complexity of the whole system. At the same time, when the spectral response curve narrows, the luminous flux decreases, thereby resulting in a lower signal-to-noise ratio.

For computational spectrometers, a wide-spectrum filter is used for each filter, which makes the data detected by the computational spectrometer system look completely different from that of the original spectrum. However, by applying computational reconstruction algorithms, the original spectrum can be computationally restored. Since a broadband filter allows more light to pass through than a narrowband filter, a computational spectrometer can detect spectrum from darker scenes. In addition, according to the compressive sensing theory, the spectral curve of a filter can be properly designed to restore the sparse spectrum with high probability, and the number of filters is much smaller than the desired number of spectral channels (recovering higher-dimensional vectors from lower-dimensional vectors), which is undoubtedly very conducive to miniaturization. On the other hand, by using a larger number of filters, the noise may be reduced by using regularization algorithm (obtaining a denoised lower-dimensional vector from a higher-dimensional vector), which increases the signal-to-noise ratio and makes the overall system more robust.

Relatively speaking, when designing a traditional spectrometer, it is necessary to design a filter according to the desirable wavelength (the effect is equivalent to the light modulation structure of the spectral chip), so that the light of a specific wavelength can pass through (generally it is designed to enhance projection of incident light with a specific wavelength, while the incident light of a non-specific wavelength band cannot be projected. By changing the structural period and diameter of nanodisks and other structures, the resonance conditions can be controlled, thereby changing the central wavelength of the incident light that can enhance the projection so as to achieve the filtering characteristics). That is to say, in the design process of traditional spectrometers, it is necessary to focus on controlling the size and position accuracy of the light modulation structure, and at the same time, it is necessary to find ways to improve its transmittance at a specific wavelength. For computational spectrometers, it is necessary to receive light in a wider range of wavelengths (e.g., 350-900 nm). Therefore, it is necessary to focus more on the refractive index during the design.

Correspondingly, as mentioned above, in this example, the spectral chip is manufactured by a specific manufacturing method, i.e., a silicon base layer 511 with a regular crystal orientation structure is formed on the surface of the semi-finished spectral chip 400, and the silicon base layer 511 has a light modulation structure 501 and has a relatively large refractive index, so that light in a relatively large range of wavelength bands can be collected and utilized.

In this specific example, the semi-finished spectral chip 400 includes an image sensing layer 410 and a signal-processing circuit layer 420 connected to the image sensing layer 410. It is worth mentioning that, the semi-finished spectral chip 400 may also include other structures. More particularly, in this example, a semi-finished spectral chip without the silicon base layer 511 having the light modulation structure 501 can be referred to as a semi-finished spectral chip 400.

Moreover, in this specific example, the semi-finished spectral chip 400 may be provided by a manufacturer, or may be obtained by processing an existing photosensitive chip. Those of ordinary skill in the art should know that existing photosensitive chips, such as CCD photosensitive chips and CMOS photosensitive chips, include a microlens layer, a color filter layer (herein, if it is a black and white chip, the color filter layer is not included), image sensing layer 410, and signal-processing circuit layer 420. Correspondingly, the semi-finished spectral chip 400 can be obtained by removing the microlens layer and the color filter layer of the existing photosensitive chip (if it is a black and white chip, only the microlens layer needs to be removed); i.e., by applying the manufacturing method for an optical device according to an example of the present application, a spectral chip used in a computational spectrometer may be manufactured by using the existing photosensitive chip, thereby reducing the application cost.

As shown in FIG. 12, in this specific example, the manufacturing procedure of the optical device includes: firstly performing preprocessing on the surface of the semi-finished spectral chip 400, so as to form a flat bonding surface for bonding to the transferring member 500 of the target transferring layer 510 on the surface of the semi-finished spectral chip 400.

Particularly, in this specific example, the process of preprocessing the surface of the semi-finished spectral chip 400 includes: forming a light-transmissive dielectric layer 430 on the surface of the semi-finished spectral chip 400, wherein the light-transmissive dielectric layer 430 is made of light-transmissive material, and has a relatively high light transmittance, so that it will not affect the light entering the semi-finished spectral chip 400.

It is worth mentioning that, in actual implementation, although the light-transmissive dielectric layer 430 requires a relatively high refractive index, the refractive index of the light-transmissive dielectric layer 430 should not be too high, the reason is that the difference in refractive index between the light-transmissive dielectric layer 430 and the semiconductor structure thereon should be guaranteed.

In this specific example, the material of the light-transmissive dielectric layer 430 is preferably silicide, for example, silicon dioxide, silicon nitride, and the like. Those skilled in the art should know that the refractive index of silicon dioxide is about 1.45, and that of silicon nitride is 1.9-2.3.

In a particular implementation, the light-transmissive dielectric layer 430 can be formed on the surface of the semi-finished spectral chip 400 by, for example, a non-metallic vapor deposition process. Of course, in other implementations of this particular example, the light-transmissive dielectric layer 430 can also be formed by other processes, it is not limited by the present application. In particular, in this specific example, the thickness dimension of the light-transmissive dielectric layer 430 is not limited by the present application, and its specific value can be adjusted according to the specific requirements of the application scene; generally, the thickness dimension is less than or equal to 300 nm, in some special circumstances it is even less than 100 nm.

As shown in FIG. 12, preferably, in this specific example, the upper surface of the light-transmissive dielectric layer 430 is a flat surface, or in other words, the part of the upper surface of the light-transmissive dielectric layer 430 used for bonding to the transferring member 500 has a relatively high flatness, so as to facilitate transferring the transferring member 500 onto the semi-finished spectral chip 400.

It is worth mentioning that, in some cases of this specific example, the surface of the semi-finished spectral chip 400 may be uneven, and the upper surface of the light-transmissive dielectric layer 430 formed on the surface of the semi-finished spectral chip 400 through a deposition process may also be uneven. Therefore, in this particular implementation, the preprocessing process also includes: polishing the surface of the semi-finished spectral chip 400, and/or polishing the upper surface of the light-transmissive dielectric layer 430. Herein, the polishing process may be a chemical mechanical polish process, or other processes that can increase the flatness of a surface. With respect to this, it is not limited by the present application.

It is worth mentioning that, in this specific example, if the surface flatness of the semi-finished spectral chip 400 meets the preset requirements, the light-transmissive dielectric layer 430 may not be provided on the surface of the semi-finished spectral chip 400, i.e., there is no need to perform preprocessing on the semi-finished spectral chip 400.

Further, as shown in FIG. 12, the manufacturing procedure of the optical device further includes: providing a transferring member 500. In particular, in this specific example, the transferring member 500 is a silicon base layer 511, i.e., in this specific example, the transferring member 500 only includes the target transferring layer 510, and the target transferring layer 510 is the silicon base layer 511. In particular, in an example of the present application, the crystal orientation arrangement of atoms in the silicon base layer 511 (i.e., the target transferring layer 510) is regular. Moreover, the refractive index of the silicon base layer 511 is about 3.42, and the difference in refractive index between the silicon base layer 511 and the light-transmissive dielectric layer 430 is greater than or equal to 0.5, preferably greater than or equal to 0.7.

In a particular implementation of this specific example, the self-made transferring member 500 can be manufactured in the following manner: firstly, a monocrystalline silicon structure with a regular crystal orientation structure is formed by a process such as the Czochralski method or floating zone melting method, wherein the monocrystalline silicon structure is the silicon base layer 511, i.e., the monocrystalline silicon structure is the transferring member 500. It should be understood that, since the atoms in the monocrystalline silicon structure have a regular crystal orientation distribution, the silicon base layer 511 also has a regular crystal orientation structure. Preferably, in this specific example, the surface of the silicon base layer 511 is a flat surface.

It is worth mentioning that, in this specific example, the transferring member 500 may also only include the silicon base layer 511, i.e., without the silicide layer 512. With respect to this, it is not limited by this example.

As shown in FIG. 12, the manufacturing procedure of the optical device further includes: coupling the transferring member 500 to the semi-finished spectral chip 400 in such a way that the lower surface of the transferring member 500 is bonded to the upper surface of the light-transmissive dielectric layer 430 of the semi-finished spectral chip 400. That is to say, the transferring member 500 is transferred to the semi-finished spectral chip 400 in such a way that the surface of the silicon base layer 511 (herein, may be the upper surface of the silicon base layer 511, or the lower surface of the silicon base layer 511) is bonded to the upper surface of the light-transmissive dielectric layer 430 of the semi-finished spectral chip 400.

In order to ensure the bonding strength between the transferring member 500 and the semi-finished spectral chip 400, preferably, in an example of the present application, the upper surface or lower surface of the transferring member 500 preferably has a good bonding reaction with the light-transmissive dielectric layer 430, so that the two surfaces can produce a good bonding reaction when bonding, thereby resulting in greater bonding force. For example, in this specific example, the lower surface or upper surface of the silicon base layer 511 is configured to be made of the same material as the light-transmissive dielectric layer 430, so that the two can produce a good bonding reaction when bonding, thereby resulting in a larger bonding force.

Taking the light-transmissive dielectric layer 430 to be made of silicon dioxide as an example, in this particular example, before bonding the lower surface or upper surface of the silicon base layer 511 to the light-transmissive dielectric layer 430, it further includes: processing the lower surface or upper surface of the silicon base layer 511, so that the lower surface or upper surface of the silicon base layer 511 is made of silicon dioxide material.

In a particular implementation, oxygen ions may be implanted into the upper or lower surface of the silicon base layer 511 to form a silicon dioxide layer on the upper or lower surface of the silicon base layer 511, so that the upper or lower surface of the transferring member 500 is made of silicon dioxide. It should be understood that, the silicon base layer 511 has a regular crystal orientation structure, therefore, the silicon dioxide layer also has a regular crystal orientation structure, so as to improve its bonding effect with the light-transmissive dielectric layer 430.

Of course, in other implementations of this specific example, a bonding layer 520 can also be stacked on the surface of the silicon base layer 511, wherein the bonding layer 520 is made of silicon dioxide material. For example, the bonding layer 520 is formed on the upper surface or the lower surface of the silicon base layer 511 by superimposition through non-metallic vapor phase a deposition process, so as to improve the bonding strength between the transferring member 500 and the semi-finished spectral chip 400 through the bonding layer 520.

It is worth mentioning that, in this specific example, the process of processing the surface of the transferring member 500 may also be completed in the step of providing the transferring member 500; with respect to this, it is not limited by the present application. That is to say, the process of processing the upper surface or lower surface of the silicon base layer 511 can be completed at the stage of preparing the transferring member 500.

As shown in FIG. 12, the preparation process of the spectral chip further includes: retaining at least a part of the target transferring layer 510 of the transferring member 500. It should be understood that, compared with the Specific Example 3 and Specific Example 4, in the manufacturing method of the spectral chip according to this specific example, the transferring member 500 only has the target transferring layer 510, i.e., the silicon base layer. Therefore, if the thickness or surface characteristics of the silicon base layer 511 meet the preset requirements, no processing is performed on the silicon base layer 511 to enter the next stage of the manufacturing procedure.

Of course, in order to obtain better surface characteristics and make the thickness of the silicon base layer 511 meet the preset requirements, in this specific example, a part of the silicon base layer 511 can be removed, and at least a part of the silicon base layer 511 can be retained.

In this specific example, the silicon base layer 511 may be removed by mechanical grinding, chemical mechanical polishing, or a combination of several processes, so as to optimize the surface characteristics of the remained silicon base layer 511 and reduce the thickness of the silicon base layer 511.

It is worth mentioning that, mechanical grinding has high efficiency but poor precision, while chemical mechanical polishing and etching processes have low efficiency but high precision. Therefore, in this specific example, it is preferable to use mechanical grinding to polish the silicon base layer 511 as the first-stage processing, and then perform the second-stage processing on the silicon base layer 511 by a chemical mechanical polishing or etching process, so as to take into account both efficiency and precision.

In particular, in this specific example, the spectral chip has certain requirements on the thickness of the silicon base layer 511, and the thickness range of the silicon base layer 511 is 5-1000 nm, preferably 50-750 nm; such a thickness is beneficial to the processing of the silicon base layer 511, so that the imaging effect of the spectral chip can be optimized and ensured. More preferably, the thickness range of the silicon base layer 511 is 150-250 nm.

As shown in FIG. 12, the manufacturing procedure of the optical device further includes: forming a light modulation structure 501 on the retained silicon base layer 511, so that the silicon base layer 511 has the light modulation structure 501. In this way, when the external imaging light enters the inside of the spectral chip through the silicon base layer 511, the silicon base layer 511 having the light modulation structure 501 can modulate the imaging light so as to extract and utilize spectral information of the imaging light. Those skilled in the art should know that, the light modulation structure 501 is actually a specific pattern formed in the silicon base layer 511, so as to perform specific modulation processing on the imaging light through the specific pattern.

Particularly, in this specific example, the refractive index of the light modulation structure 501 is 1-5, and the difference between the refractive index of the light modulation structure 501 and that of the light-transmissive dielectric layer 430 greater than or equal to 0.5, preferably greater than or equal to 0.7. In this way, light with a relatively large range of wavelengths can penetrate the light-transmissive dielectric layer 430 and the image sensing layer 410 of the spectral chip after passing through the light modulation structure 501.

In the particular implementation of this specific example, the light modulation structure 501 may be formed on the silicon base layer 511 by etching, nanoimprinting and other processes. Correspondingly, after the light modulation structure 501 is formed, the manufacture of the spectral chip is completed. Particularly, the specific technological process of nanoscreen printing process is as follows: firstly, coating photosensitive material (e.g., photoresist) on the surface of metal film on the wafer; then pressing the template engraved with filter pattern on it, especially the template is transparent; next, irradiating ultraviolet light (UV light) thereto, so as to harden the photoresist on which the template pattern has been printed. The template is then peeled off to reveal the patterned photoresist.

It should be understood that, in this specific example, the atoms in the silicon base layer 511 have a regular crystal orientation distribution, and when it is transferred to the surface of the semi-finished spectral chip 400 through the above-mentioned manufacturing method, the internal structure of the silicon base layer 511 has not changed. Therefore, the spectral chip prepared according to the manufacturing method disclosed in this specific example has an optical layer structure formed on its surface with a better crystal orientation arrangement.

In summary, based on this specific example, the spectral chip and the manufacturing method thereof are clarified, which uses a specific manufacturing method to transfer the silicon base layer 511 with a better crystal orientation arrangement to the surface of the semi-finished spectral chip 400, so that the surface of the final manufactured spectral chip has an optical layer structure with better crystal orientation arrangement.

Figure 13:
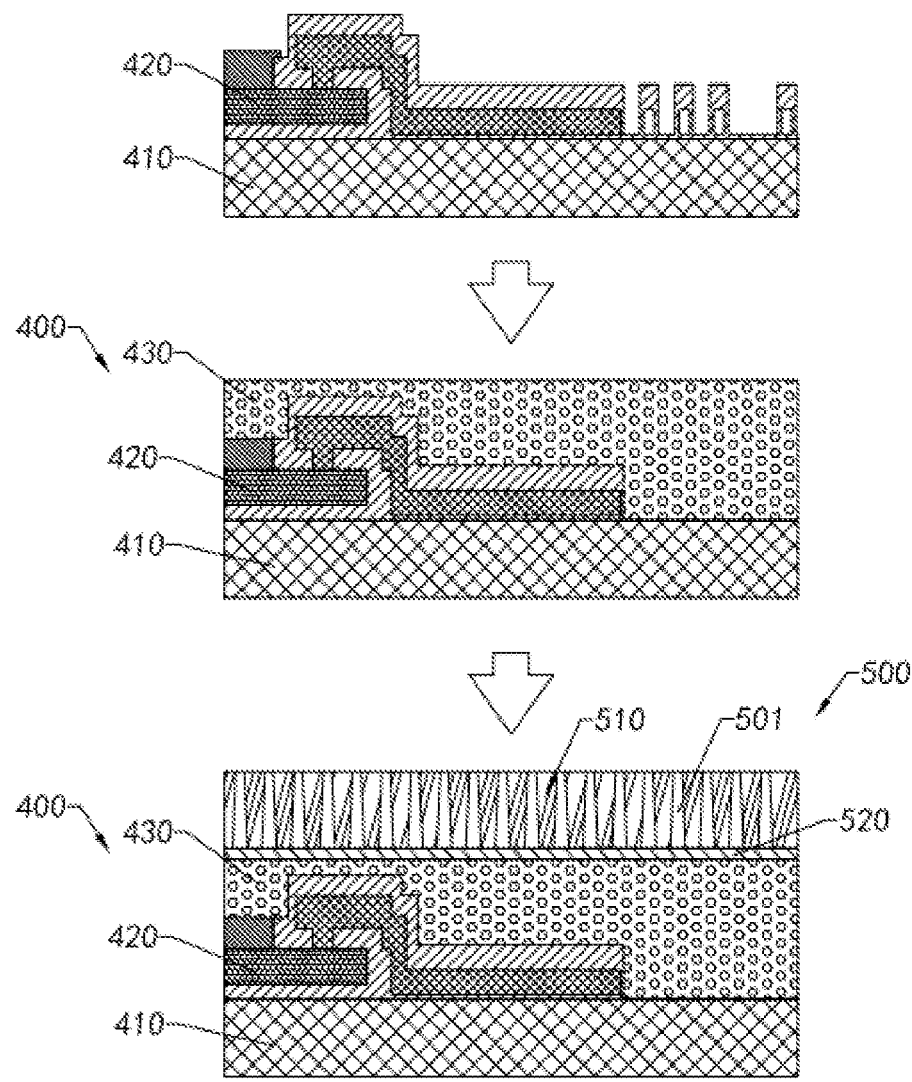
FIG. 13 shows a schematic diagram of another modified implementation of the optical device and the manufacturing method for an optical device illustrated according to Specific Example 5.

It is worth mentioning that, in some other modified implementations according to the specific example, before transferring the transferring member 500 to the semi-finished spectral chip 400 through bonding process, the silicon base layer 511 of the transferring member 500 is pre-processed to form the light modulation structure 501 in the silicon base layer 511, and the effect is shown in FIG. 13, wherein the thickness of the silicon base layer is 200-1000 nm, preferably 350-600 nm. Correspondingly, when the silicon base layer 511 is subsequently bonded to the surface of the semi-finished spectral chip 400, the light modulation structure 501 is also transferred synchronously to the surface of the semi-finished spectral chip 400. That is to say, in this modified example, the light modulation structure 501 is firstly prefabricated on the transferring member 500, or in other words, the process of forming the light modulation structure 501 is adjusted forward.

It is worth mentioning that, in the above example or modified example, the thickness of the silicon base layer 511 in the transferring member 200 is relatively thin, but when the transferring member 200 is bonded to the semi-finished spectral chip 400, stress will be generated inside the transferring member 200 after bonding; therefore, when removing other layer other than the target transferring layer 510 of the transferring member 200, the existence of the stress will cause the target transferring layer 510 of the transferring member 200 cracked, or during the formation of the light modulation structure 501 it will be cracked due to stress.

With respect to the above technical problems, in some examples of the present application, the manufacturing method of the spectral chip is further improved. Particularly, the key to the improved technique is to release the stress in advance.

Optionally, before the transferring member 200 is transferred, at least one stress hole 5100 is formed on the corresponding target transferring layer 510, and the stress hole 5100 is used to release stress. It should be understood that, the stress hole 5100 can be formed after bonding or before bonding.

Figure 16:
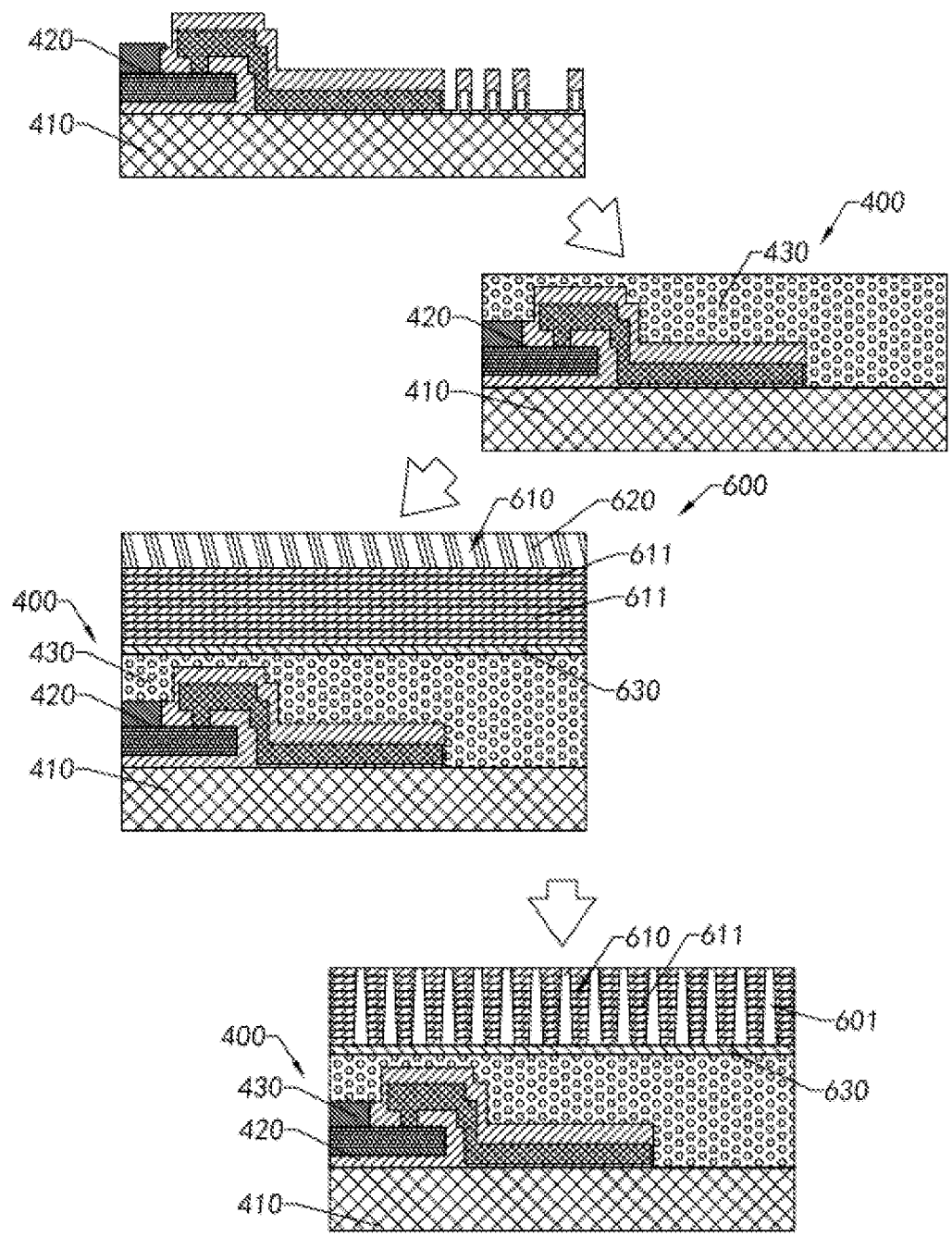
FIG. 16 shows a schematic diagram of Specific Example 6 of the optical device and the manufacturing method for an optical device according to an example of the present application.

Correspondingly, in the process of forming the stress hole 5100 after bonding, as shown in FIG. 16, the stress hole 5100 can be formed after removing a part of the transferring member 200, i.e., firstly removing at least a part of the transferring member 200 to retain the target transferring layer 510 and a part of other layer structure, at this time, the stress holes 5100 are formed in the other layer structure and the target transferring layer 510 before continuing to remove other layer structure. It should be understood that, after a part of the transferring member 200 is removed, since the retained part of the transferring member 200 is too thin, a continued removal will cause cracking due to the existing stress. At this time, the stress hole 5100 should be formed in advance under the condition of a bigger thickness.

For example, when the target transferring layer 510 is the silicon crystal layer 513, the silicide layer 512 has not been completely removed, and the stress hole 5100 can be formed on the silicide layer 512 and the silicon crystal layer 513; i.e., the stress hole 5100 penetrates the silicide layer 512 and forms a through hole or a blind hole on the silicon crystal layer 513, then removing the silicide layer 512.

Figure 17:
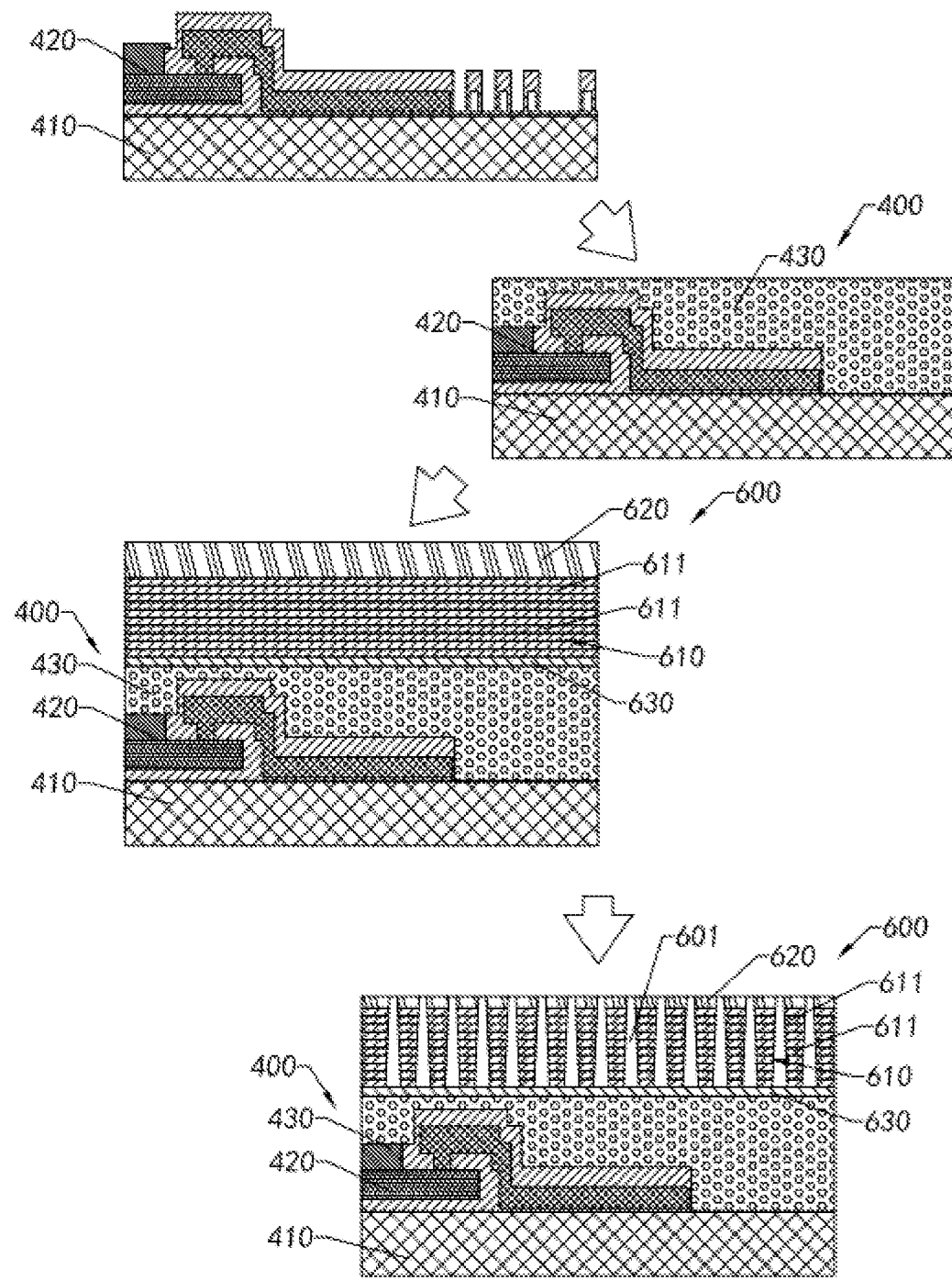
FIG. 17 shows a schematic diagram of another modified implementation of the optical device and the manufacturing method for an optical device illustrated according to Specific Example 6.

Moreover, for an example in which the light modulation structure 501 is formed after bonding, due to the existence of stress, the light modulation structure 501 is obtained by etching, nanoimprinting and other processes, and the target transferring layer 510 is prone to be cracked. Correspondingly, in this example, a protective film 700 can be further selected to be formed on the surface of the light modulation layer or the target transferring layer 510, preferably the protective film 700 can be hafnium dioxide ($HfO_2$), and then with the light modulation structure 501 is formed on the target transferring layer 510 of the protective film 700, as shown in FIG. 17.

Figure 14:
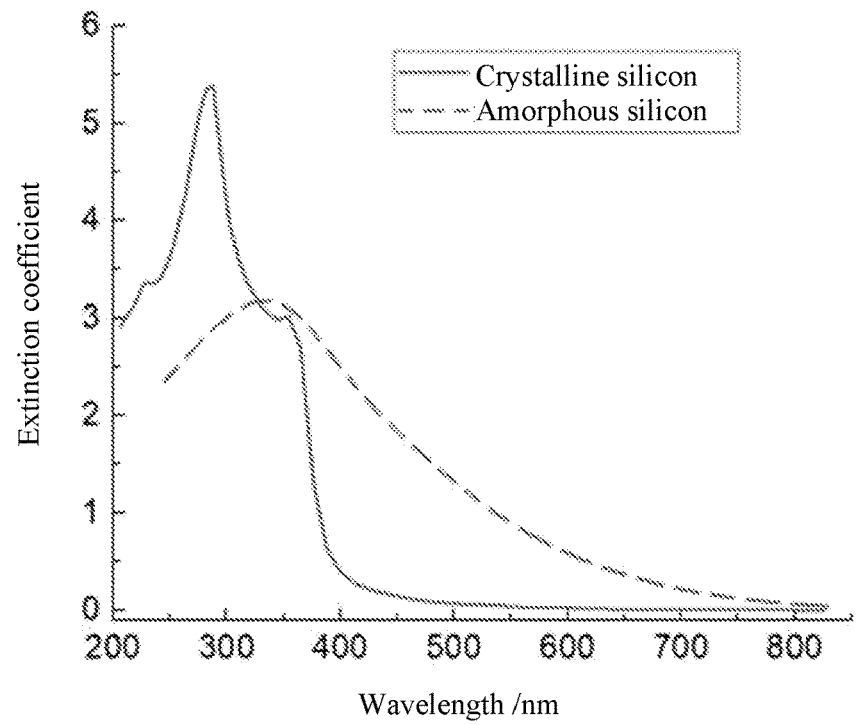
FIG. 14 and FIG. 15 show schematic diagrams illustrating the performance comparison between the spectral chip manufactured according to the manufacturing methods in Specific Example 3, Specific Example 4 and Specific Example 5 and the conventional spectral chip.
Figure 15:
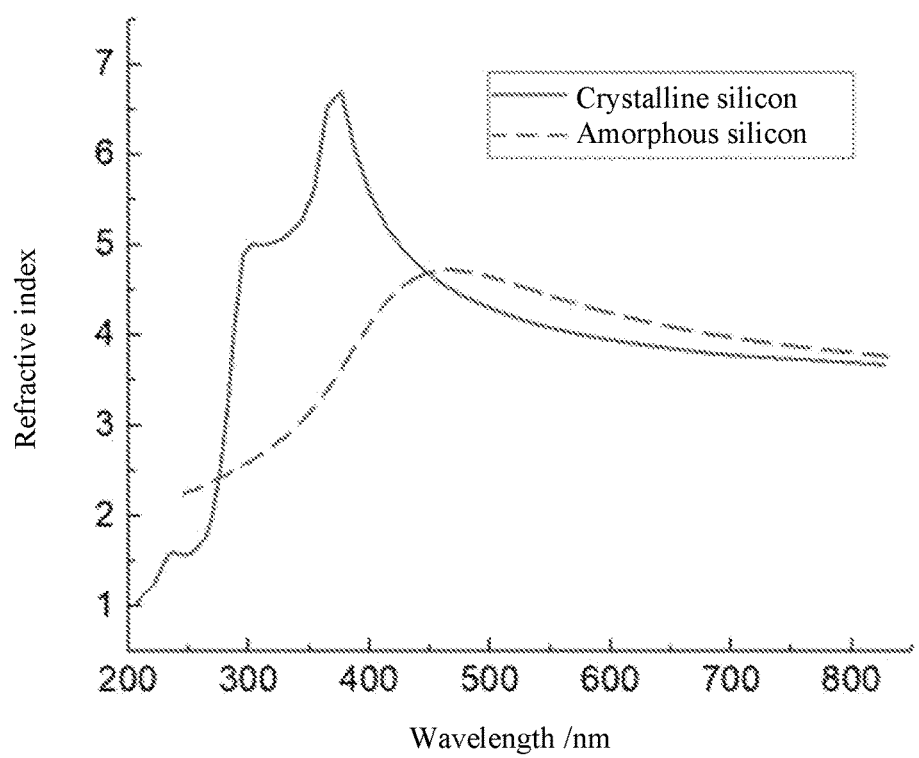

As shown in FIG. 14, the extinction coefficient of the spectral chip manufactured according to the manufacturing method of this specific example is much better than that of the existing spectral chip. As shown in FIG. 15, the refractive index of the spectral chip manufactured according to the manufacturing method of this specific example is also much better than that of the existing spectral chip.

Performance Testing

FIG. 14 and FIG. 15 are schematic diagrams illustrating the comparison of the performance of the spectral chip manufactured according to the manufacturing method shown in Specific Example 3, Specific Example 4 and Specific Example 5 with that of the existing spectral chip. As shown in FIG. 14, the extinction coefficient of the spectral chip manufactured according to the manufacturing method of this specific example in desired wavelength range (i.e., 350-900 nm) is much better than that of the existing spectral chip. As shown in FIG. 15, the refractive index of the spectral chip manufactured according to the manufacturing method of this specific example in desired wavelength range (i.e., 350-900 nm) is also far better than the existing spectral chip.

Specific Example 6

FIG. 16 shows a schematic diagram of another specific example of the optical device and the manufacturing method for an optical device according to still another example of the present application. As shown in FIG. 16, in this specific example, the optical device is a spectral chip, the optical device body 110 is a semi-finished spectral chip 400, and the purpose of the manufacturing method is to form a target transferring layer 610 with a high refractive index on the surface of the semi-finished spectral chip 400, and the target transferring layer 610 has a light modulation structure 601 for modulating the imaging light entering the spectral chip, so as to extract and utilize spectral information in the imaging light.

Herein, the spectral chip involved in this application is applied to a computational spectrometer, wherein the most significant difference between a computational spectrometer and a traditional spectrometer lies in the difference in light filtering. In traditional spectrometers, the filters for wavelength selection are bandpass filters. The higher the spectral resolution is, a filter with narrower and more passband must be used, which increases the size and complexity of the whole system. At the same time, when the spectral response curve narrows, the luminous flux decreases, thereby resulting in a lower signal-to-noise ratio.

For computational spectrometers, a wide-spectrum filter is used for each filter, which makes the data detected by the computational spectrometer system look completely different from that of the original spectrum. However, by applying computational reconstruction algorithms, the original spectrum can be computationally restored. Since a broadband filter allows more light to pass through than a narrowband filter, a computational spectrometer can detect spectrum from darker scenes. In addition, according to the compressive sensing theory, the spectral curve of a filter can be properly designed to restore the sparse spectrum with high probability, and the number of filters is much smaller than the desired number of spectral channels (recovering higher-dimensional vectors from lower-dimensional vectors), which is undoubtedly very conducive to miniaturization. On the other hand, by using a larger number of filters, the noise may be reduced by using regularization algorithm (obtaining a denoised lower-dimensional vector from a higher-dimensional vector), which increases the signal-to-noise ratio and makes the overall system more robust.

Relatively speaking, when designing a traditional spectrometer, it is necessary to design a filter according to the desirable wavelength (the effect is equivalent to the light modulation structure of the spectral chip), so that the light of a specific wavelength can pass through (generally it is designed to enhance projection of incident light with a specific wavelength, while the incident light of a non-specific wavelength band cannot be projected. By changing the structural period and diameter of nanodisks and other structures, the resonance conditions can be controlled, thereby changing the central wavelength of the incident light that can enhance the projection so as to achieve the filtering characteristics). That is to say, in the design process of traditional spectrometers, it is necessary to focus on controlling the size and position accuracy of the light modulation structure, and at the same time, it is necessary to find ways to improve its transmittance at a specific wavelength. For computational spectrometers, it is necessary to receive light in a wider range of wavelengths (e.g., 350-900 nm). Therefore, it is necessary to focus more on the refractive index during the design.

Correspondingly, as mentioned above, in this example, the spectral chip is manufactured by the above manufacturing method, i.e., a target transferring layer 610 with high transmittance is formed on the surface of the semi-finished spectral chip 400, wherein the target transferring layer 610 has a light modulation structure 601, so that light in a relatively large range of wavelength bands can be collected and utilized. In particular, in this specific example, the target transferring layer 610 has a refractive index greater than or equal to 2.3.

In this specific example, the semi-finished spectral chip 400 includes an image sensing layer 410 and a signal-processing circuit layer 420 connected to the image sensing layer 410. It is worth mentioning that, the semi-finished spectral chip 400 may also include other structures. More particularly, in this example, a semi-finished spectral chip without the target transferring layer 610 having the light modulation structure 601 can be referred to as a semi-finished spectral chip 400.

Moreover, in this specific example, the semi-finished spectral chip 400 may be provided by a manufacturer, or may be obtained by processing an existing photosensitive chip. Those of ordinary skill in the art should know that existing photosensitive chips, such as CCD photosensitive chips and CMOS photosensitive chips, comprise a microlens layer, a color filter layer (herein, if it is a black and white chip, the color filter layer is not included), image sensing layer 410, and signal-processing circuit layer 420. Correspondingly, the semi-finished spectral chip 400 can be obtained by removing the microlens layer and the color filter layer of the existing photosensitive chip (if it is a black and white chip, only the microlens layer needs to be removed); i.e., by applying the manufacturing method for an optical device according to an example of the present application, a spectral chip used in a computational spectrometer may be prepared by using the existing photosensitive chip, thereby reducing the application cost.

As shown in FIG. 16, in this specific example, the manufacturing procedure of the optical device includes: firstly performing preprocessing on the surface of the semi-finished spectral chip 400, so as to form a flat bonding surface for bonding to the transferring member of the target transferring layer 610 on the surface of the semi-finished spectral chip 400.

Particularly, in this specific example, the process of preprocessing the surface of the semi-finished spectral chip 400 includes: forming a light-transmissive dielectric layer 430 on the surface of the semi-finished spectral chip 400, wherein the light-transmissive dielectric layer 430 is made of light-transmissive material, and has a relatively high light transmittance, so that it will not affect the light entering the semi-finished spectral chip 400.

It is worth mentioning that, in actual implementation, although the light-transmissive dielectric layer 430 requires a relatively high refractive index, the refractive index of the light-transmissive dielectric layer 430 should not be too high, the reason is that the difference in refractive index between the light-transmissive dielectric layer 430 and the semiconductor structure layer thereon should be guaranteed.

In this specific example, the material of the light-transmissive dielectric layer 430 is preferably silicide, for example, silicon dioxide, silicon nitride, and the like. Those skilled in the art should know that the refractive index of silicon dioxide is about 1.45, and that of silicon nitride is 1.9-2.3.

In a particular implementation, the light-transmissive dielectric layer 430 can be formed on the surface of the semi-finished spectral chip 400 by, for example, a non-metallic vapor deposition process. Of course, in other implementations of this particular example, the light-transmissive dielectric layer 430 can also be formed by other processes. With respect to the forming process, it is not limited by the present application. In particular, in this specific example, the thickness dimension of the light-transmissive dielectric layer 430 is not limited by the present application, and its specific value can be adjusted according to the specific requirements of the application scene; generally, the thickness dimension is less than or equal to 300 nm, in some special circumstances it is even less than 100 nm.

As shown in FIG. 16, preferably, in this specific example, the upper surface of the light-transmissive dielectric layer 430 is a flat surface, or in other words, the part of the upper surface of the light-transmissive dielectric layer 430 used for bonding to the transferring member has a relatively high flatness, so as to facilitate transferring the transferring member onto the semi-finished spectral chip 400.

It is worth mentioning that, in some cases of this specific example, the surface of the semi-finished spectral chip 400 may be uneven, and the upper surface of the light-transmissive dielectric layer 430 formed on the surface of the semi-finished spectral chip 400 through a deposition process may also be uneven. Therefore, in this particular implementation, the preprocessing process also includes: polishing the surface of the semi-finished spectral chip 400, and/or polishing the upper surface of the light-transmissive dielectric layer 430. Herein, the polishing process may be a chemical mechanical polish process, or other processes that can increase the flatness of a surface. With respect to this, it is not limited by the present application.

It is worth mentioning that, in this specific example, if the surface flatness of the semi-finished spectral chip 400 meets the preset requirements, the light-transmissive dielectric layer 430 may not be provided on the surface of the semi-finished spectral chip 400, i.e., there is no need to perform preprocessing on the semi-finished spectral chip 400.

Further, as shown in FIG. 16, the manufacturing procedure of the optical device further includes: providing a transferring member 600. In particular, in this specific example, the transferring member 600 is a self-made semiconductor device, which from bottom to top sequentially includes: a substrate 620 and the target transferring layer 610 formed on the substrate 620, wherein the substrate 620 is made of chemically active and relatively stable material, and the target transferring layer 610 is made of high transmittance material which includes but not limited to: tantalum oxide, titanium oxide and the like. Preferably, in this specific example, the surface of the target transferring layer 610 is a flat surface.

Those of ordinary skill in the art should know that, for the light modulation structure 601 of the spectral chip, the higher the refractive index of the target transferring layer 610 is, the more advantageous it is. However, if the refractive index of the target transferring layer 610 is too high, the thickness of the target transferring layer 610 cannot meet the requirements due to the limitation of the technology. In particular, in this specific example, the thickness of the target transferring layer 610 is greater than 350 nm. Therefore, in this specific example, the target transferring layer 610 of the transferring member 600 is manufactured by using a specific process, so that the target transferring layer 610 can meet the thickness requirement while having high transmittance.

Particularly, taking the target transferring layer 610 to be made of tantalum oxide as an example, in a particular implementation of this specific example, the target transferring layer 610 is formed by bonding. More particularly, a relatively thin tantalum oxide layer is firstly formed on the substrate 620, for example, the thickness of the tantalum oxide layer is 80 nm; and then other tantalum oxide layers are stacked one on top of another through bonding process, so as to obtain the target transferring layer 610 meeting the preset thickness requirement. That is to say, other tantalum oxide layers are accumulated layer by layer through bonding process, so that the final thickness of the target transferring layer 610 meets the preset requirement, i.e., greater than or equal to 350 nm.

It is worth mentioning that before each bonding, the bonding surface can be ground to optimize the bonding effect.

As shown in FIG. 16, the manufacturing procedure of the optical device further includes: coupling the transferring member 600 to the semi-finished spectral chip 400 in such a way that the upper surface of the transferring member 600 is bonded to the upper surface of the light-transmissive dielectric layer 430 of the semi-finished spectral chip 400; i.e., transferring the transferring member 600 to the semi-finished spectral chip 400 in such a way that the upper surface of the target transferring layer 610 of the transferring member 600 is bonded to the upper surface of the light-transmissive dielectric layer 430 of the semi-finished spectral chip 400.

In order to ensure the bonding strength between the transferring member 600 and the semi-finished spectral chip 400, preferably, in an example of the present application, the upper surface of the transferring member 600 is preferably has a good bonding reaction with the light-transmissive dielectric layer 430, so that the two surfaces can produce a good bonding reaction when bonding, thereby resulting in greater bonding force. For example, in this specific example, the upper surface of the transferring member 600 is configured to be made of the same material as the light-transmissive dielectric layer 430, so that the two can produce a good bonding reaction when bonding, thereby resulting in a larger bonding force.

Taking the light-transmissive dielectric layer 430 to be made of silicon dioxide as an example, it should be understood that in this specific example, the upper surface of the transferring member 600 is formed by the upper surface of the target transferring layer 610. Therefore, in this particular example, a bonding layer 630 can be stacked on the upper surface of the target transferring layer 610, wherein the bonding layer 630 is made of silicon dioxide material, for example, the bonding layer 630 is formed on the surface of the target transferring layer 610 by superimposition through a non-metallic vapor deposition process, so as to improve the bonding strength between the transferring member 600 and the semi-finished spectral chip 400 through the bonding layer 630.

It is worth mentioning that, in this specific example, the process of processing the bonding surface of the transferring member 600 can also be completed in the step of providing the transferring member 600. With respect to this, it is not limited by the present application.

As shown in FIG. 16, the manufacturing procedure of the optical device further includes: retaining the target transferring layer 610 of the transferring member 600. In this specific example, one or a combination of mechanical grinding, chemical mechanical polishing, and etching processes can be used to remove the substrate 620, so that the target transferring layer 610 of the transferring member 600 is retained.

It is worth mentioning that, mechanical grinding has high efficiency but poor precision, while chemical mechanical polishing and etching processes have low efficiency but high precision. Therefore, in this specific example, it is preferable to use mechanical grinding to polish the substrate 620 as the first-stage processing, and then perform the second-stage processing on the substrate 620 by a chemical mechanical polishing or etching process, so as to take into account both efficiency and precision.

Correspondingly, in this specific example, in order to meet the thickness requirement, the process of removing the substrate 620 further includes removing a part of the target transferring layer 610, so that the thickness dimension of the target transferring layer 610 meets the preset requirements.

As shown in FIG. 16, the manufacturing procedure of the optical device further includes: forming a light modulation structure 601 on the retained target transferring layer 610, so that the target transferring layer 610 has the light modulation structure 601. In this way, when the external imaging light enters the inside of the spectral chip through the target transferring layer 610, the target transferring layer 610 with the light modulation structure 601 can modulate the imaging light to extract and utilize spectral information of the imaging light. Those of ordinary skill in the art should know that, the light modulation structure 601 is actually a specific pattern formed in the target transferring layer 610, so as to perform specific modulation processing on the imaging light through the specific pattern.

Particularly, in this specific example, the refractive index of the light modulation structure 601 is greater than 2.3, and the difference between the refractive index of the light modulation structure 601 and that of the light-transmissive dielectric layer 430 greater than or equal to 0.5, preferably greater than or equal to 0.7. In this way, light with a relatively large range of wavelengths can penetrate the light-transmissive dielectric layer 430 and the image sensing layer 410 of the spectral chip after passing through the light modulation structure 601.

In the particular implementation of this specific example, the light modulation structure 601 may be formed in the target transferring layer 610 by etching, nanoimprinting and other processes. Correspondingly, after the light modulation structure 601 is formed, the manufacture of the spectral chip is completed. Particularly, the specific technological process of nanoscreen printing process is as follows: firstly, coating photosensitive material (e.g., photoresist) on the surface of metal film on the wafer; then pressing the template engraved with filter pattern on it, especially the template is transparent; next, irradiating ultraviolet light (UV light) thereto, so as to harden the photoresist on which the template pattern has been printed. The template is then peeled off to reveal the patterned photoresist.

It should be understood that, in this specific example, the target transferring layer 610 of the transferring member 600 has a relatively high refractive index, and when it is transferred to the surface of the semi-finished spectral chip 400 through the above-mentioned manufacturing method, the internal structure of the target transferring layer 610 has not changed. Therefore, the spectral chip manufactured according to the manufacturing method disclosed in this specific example has an optical layer structure formed on its surface with a relatively high refractive index.

In summary, based on this specific example, the spectral chip and the manufacturing method thereof are clarified, which uses a specific manufacturing method to transfer the target transferring layer 610 (including but not limited to tantalum oxide layer, titanium oxide layer) with a higher refractive index to the surface of the semi-finished spectral chip 400, so that the surface of the finally manufactured spectral chip has an optical layer structure with a higher refractive index.

It is worth mentioning that, in some modified implementations of this specific example, a part of the substrate 620 in the transferring member 600 may also be retained, i.e., in this modified implementation, only at least a part of the substrate 620 is removed, so that a part of the substrate 620 and the target transferring layer 610 are retained. Herein, the retained substrate 620 can provide a certain protection for the target transferring layer 610. Correspondingly, during the subsequent process of forming the light modulation structure 601, the retained substrate 620 is also partially etched, and the final forming effect is shown in FIG. 17.

Figure 18:
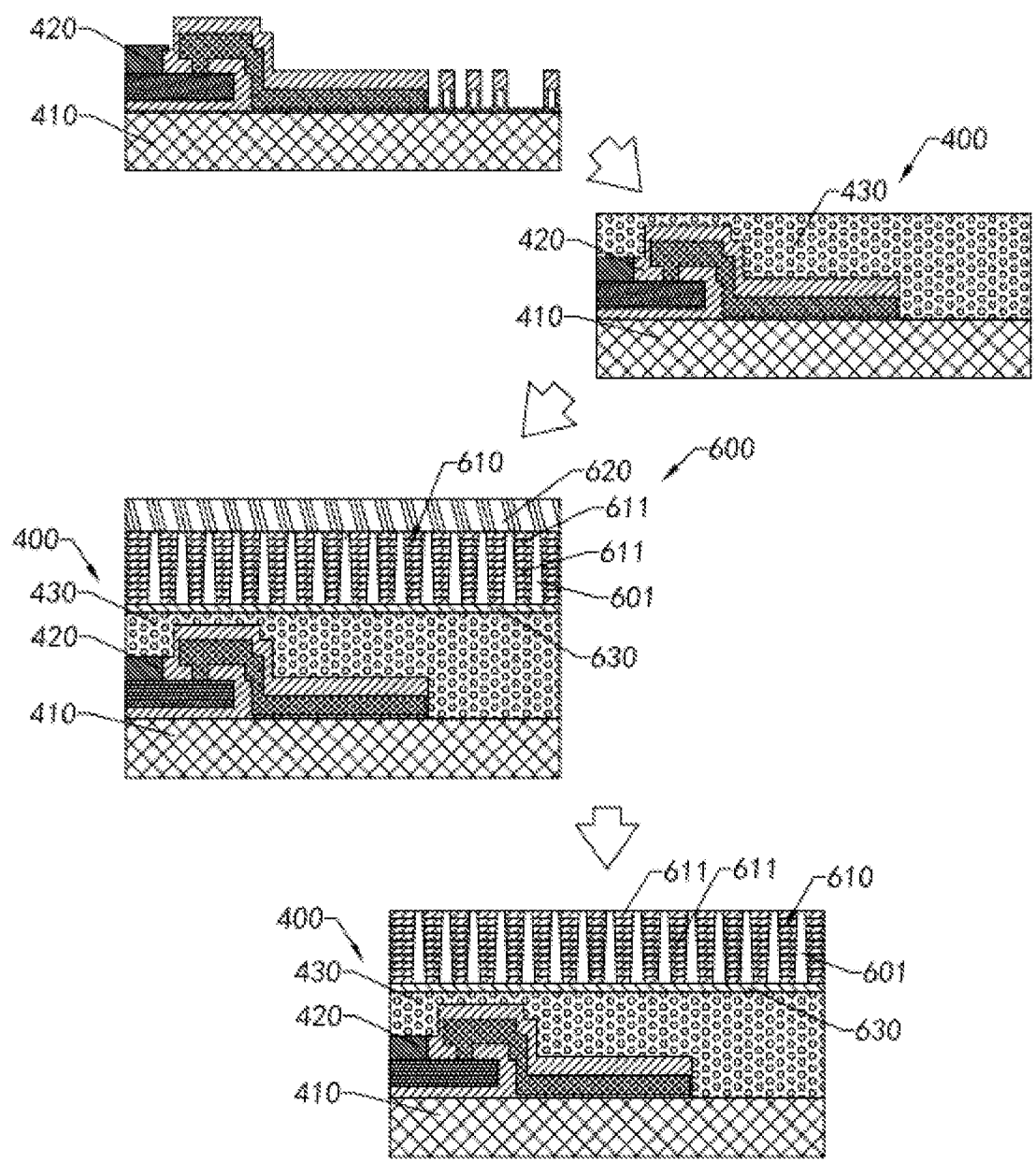
FIG. 18 shows a schematic diagram of still another modified implementation of the optical device and the manufacturing method for an optical device illustrated according to Specific Example 6.

It is also worth mentioning that, in some other modified implementations of this specific example, before transferring the transferring member 600 to the semi-finished spectral chip 400 through bonding process, the target transferring layer 610 of the transferring member 600 is pre-processed to form the light modulation structure 601 in the target transferring layer 610, the effect is shown in FIG. 18; wherein the thickness of the target transferring layer 610 is greater than or equal to 350 nm. Correspondingly, when the target transferring layer 610 is retained subsequently, the light modulation structure 601 of the target transferring layer 610 is also retained synchronously. That is to say, in this modified example, the light modulation structure 601 is firstly prefabricated in the target transferring layer 610 of the transferring member 600, or in other words, the process of forming the light modulation structure 601 is adjusted forward.

Figure 19:
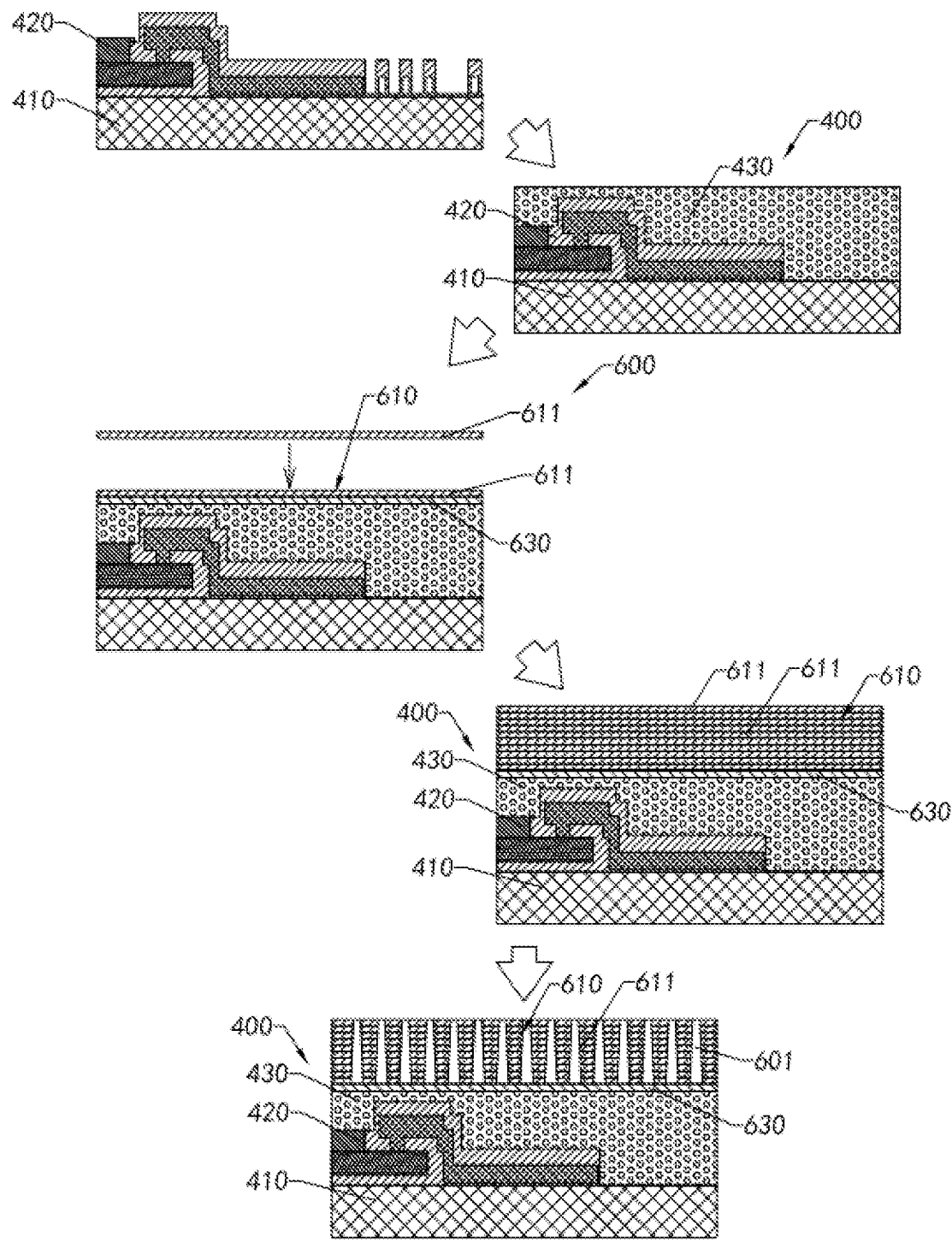
FIG. 19 shows a schematic diagram of yet another modified implementation of the optical device and the manufacturing method for an optical device illustrated in Specific Example 6.

FIG. 19 shows a schematic diagram of another modified implementation of the optical device and the manufacturing method for an optical device according to the Specific Example 6. As shown in FIG. 19, in this modified implementation of this specific example, the target transferring layer 610 includes a plurality of sub-transferring layers 611 stacked one on top of another, wherein during the manufacturing procedure, each sub-transferring layer 611 is separately formed on the upper surface of the light-transmissive dielectric layer 430 by superimposition through bonding process.

It should be understood by those skilled in the art that, the examples of the present invention illustrated in the above description and drawings are only examples and do not limit the present invention. The objects of the present invention have been fully and effectively accomplished. The functions and structural principles of the present invention have been shown and described in the examples, and the examples of the present invention may have any deformation or modification without departing from the principles.

The invention claimed is:

1. A manufacturing method for an optical device, characterized by comprising:
providing a transferring member and an optical device to be transferred, wherein the transferring member includes a target transferring layer having a regular crystal orientation structure;
forming a light-transmissive dielectric layer on a surface of the optical device to be transferred;
coupling the transferring member to the optical device to be transferred in such a way that the target transferring layer of the transferring member is bonded to the light-transmissive dielectric layer of the optical device to be transferred; and
retaining at least a part of the target transferring layer of the transferring member to form the optical device.

2. The manufacturing method for the optical device according to claim 1, wherein forming the light-transmissive dielectric layer on the surface of the optical device to be transferred includes:
depositing the light-transmissive dielectric layer on the surface of the optical device to be transferred by a vapor deposition process; and
processing the upper surface of the light-transmissive dielectric layer so that the upper surface of the light-transmissive dielectric layer is a flat surface.

3. The manufacturing method for the optical device according to claim 2, wherein before depositing the light-transmissive dielectric layer on the surface of the optical device to be transferred by the vapor deposition process, it further includes:
preprocessing the surface of the optical device to be transferred, so that the part of the surface of the optical device to be transferred for depositing the light-transmissive dielectric layer is a flat surface.

4. The manufacturing method for the optical device according to claim 1, wherein the transferring member further includes a bonding layer formed on the surface of the target transferring layer, and the bonding layer is made of the same material as the light-transmissive dielectric layer;
wherein coupling the transferring member to the optical device to be transferred in such a way that the target transferring layer of the transferring member is bonded to the light-transmissive dielectric layer of the optical device to be transferred includes:
coupling the transferring member to the optical device to be transferred in such a way that the bonding layer formed on the surface of the target transferring layer is bonded to the light-transmissive dielectric layer of the optical device to be transferred.

5. The manufacturing method for the optical device according to claim 4, wherein forming the bonding layer on the surface of the target transferring layer of the transferring member includes:
processing the surface of the target transferring layer to form the bonding layer on the surface of the target transferring layer of the transferring member, wherein the bonding layer is made of the same material as the light-transmissive dielectric layer.

6. The manufacturing method for the optical device according to claim 1, wherein retaining at least a part of the target transferring layer of the transferring member to form an optical device includes:
removing other portions of the transferring member than the target transferring layer to retain the target transferring layer of the transferring member to form the optical device.

7. The manufacturing method for the optical device according to claim 1, wherein the target transferring layer is a silicon crystal layer or a silicide layer.

8. The manufacturing method for the optical device according to claim 1, wherein the optical device to be transferred is a semi-finished spectral chip, and the optical device is a spectral chip.

9. The manufacturing method for the optical device according to claim 8, wherein retaining at least a part of the target transferring layer of the transferring member to form the optical device includes:
forming a light modulation structure on the retained target transferring layer to form the optical device.

10. The manufacturing method for the optical device according to claim 8, wherein the target transferring layer of the transferring member has a light modulation structure formed therein.

11. The manufacturing method for the optical device according to claim 10, wherein coupling the transferring member to the optical device to be transferred in such a way that the target transferring layer of the transferring member is bonded to the light-transmissive dielectric layer of the optical device to be transferred includes:
forming a bonding layer on the surface of the silicon crystal layer of the transferring member, wherein the bonding layer is made of the same material as the light-transmissive dielectric layer; and
coupling the transferring member to the semi-finished spectral chip in such a way that the bonding layer formed on the surface of the silicon crystal layer is bonded to the light-transmissive dielectric layer of the semi-finished spectral chip.

12. The manufacturing method for the optical device according to claim 11, wherein the light-transmissive dielectric layer is made of silicide, and the bonding layer is stacked on the surface of the silicon crystal layer, and the bonding layer is made of the same material as the light-transmissive dielectric layer.

13. The manufacturing method for the optical device according to claim 1, wherein retaining at least a part of the target transferring layer of the transferring member to form the optical device includes:
removing a silicon base layer and a silicide layer of the transferring member to retain the silicon crystal layer.

14. The manufacturing method for the optical device according to claim 13 wherein retaining at least a part of the target transferring layer of the transferring member to form the optical device further includes:
forming a light modulation structure on the retained silicon crystal layer to form the spectral chip.

15. The manufacturing method for the optical device according to claim 14, wherein the thickness of the retained silicon crystal layer is 150-250 nm.

16. The manufacturing method for the optical device according to claim 13, wherein the silicon crystal layer has a light modulation structure formed therein;
wherein retaining at least a part of the silicon crystal layer of the transferring member to form the spectral chip includes:
removing the silicon base layer and the silicide layer of the transferring member to retain the silicon crystal layer with the light modulation layer.

17. The manufacturing method for the optical device according to claim 13, wherein the difference between the refractive index of the light modulation structure and that of the light-transmissive dielectric layer is greater than or equal to 0.5.

18. The manufacturing method for the optical device according to claim 1, wherein retaining at least a part of the target transferring layer of the transferring member to form the optical device includes:
removing at least a part of a silicon base layer and a silicide layer of the transferring member to retain at least a part of the silicon crystal layer and the silicide layer.

19. The manufacturing method for an optical device according to claim 1, wherein retaining at least a part of the target transferring layer of the transferring member to form the optical device includes:
removing at least a part of the silicon base layer and the silicide layer of the transferring member; and
forming at least one stress hole in the silicon crystal layer of the transferring member.

20. An optical device, characterized by being manufactured by the manufacturing method according to claim 1.

* * * * *